(12) United States Patent
Beaverson et al.

(10) Patent No.: US 7,640,262 B1
(45) Date of Patent: Dec. 29, 2009

(54) POSITIONAL ALLOCATION

(75) Inventors: Arthur Beaverson, Boxborough, MA (US); Bin Yang, Northborough, MA (US); Jamie Pocas, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 206 days.

(21) Appl. No.: 11/480,322

(22) Filed: Jun. 30, 2006
(Under 37 CFR 1.47)

(51) Int. Cl.
*G06F 17/30* (2006.01)

(52) U.S. Cl. .................. 707/101; 707/100; 711/111; 711/112; 711/113; 711/114

(58) Field of Classification Search .......... 707/1, 707/4, 101; 711/111–114
See application file for complete search history.

(56) References Cited

U.S. PATENT DOCUMENTS

| | | | | |
|---|---|---|---|---|
| 5,043,872 | A * | 8/1991 | Cheng et al. | 707/2 |
| 5,737,594 | A | 4/1998 | Williams | |
| 5,852,822 | A * | 12/1998 | Srinivasan et al. | 707/4 |
| 6,078,745 | A * | 6/2000 | De Greef et al. | 717/151 |
| 6,134,597 | A | 10/2000 | Rieth et al. | |
| 6,185,569 | B1 * | 2/2001 | East et al. | 707/101 |
| 6,253,226 | B1 * | 6/2001 | Chidambaran et al. | 707/101 |
| 6,507,846 | B1 * | 1/2003 | Consens | 707/100 |
| 6,704,730 | B2 | 3/2004 | Moulton et al. | |
| 6,810,398 | B2 | 10/2004 | Moulton | |
| 2005/0038798 | A1 * | 2/2005 | Sample | 707/100 |
| 2006/0059173 | A1 * | 3/2006 | Hirsch et al. | 707/100 |
| 2006/0288159 | A1 * | 12/2006 | Haruna et al. | 711/113 |

OTHER PUBLICATIONS

*Redundancy Elimination Within Large Collections of Files*, Purushottam Kulkarni, et al., Proceedings of the 2004 USENIX Annual Technical Conference, Boston, MA, Jun. 2004 (pp. 1-14).
*Efficient Algorithms for Sorting and Synchronization*, Andrew Tridgell, Doctoral Thesis, The Australian National University, Feb. 1999 (115 pages).
*Venti: A New Approach to Archival Storage*, Sean Quinlan, et al.
*Semantically-Smart Disk Systems*, Muthian Sivathanu, et al., 2nd USENIX Conference on File and Storage Technologies, Mar. 31-Apr. 2, 2003.
*A Two-Tiered Software Architecture for Automated Tuning of Disk Layouts*, Brandon Salmon, et al., Apr. 2003, (12 pp.).
*A Low Bandwidth Network File System*, Athicha Muthitacharoen, et al., TR CS-96-08.
Using Content-Derived Names for Caching and Software Distribution, Ethan L. Miller, et al., TR CS-96-08.

(Continued)

*Primary Examiner*—Etienne P LeRoux
*Assistant Examiner*—Thuy (Tiffany) Bui
(74) *Attorney, Agent, or Firm*—Muirhead and Saturnelli, LLC

(57) ABSTRACT

Described are techniques for managing an index structure used to access data portions. A token having a token value for a data portion is provided. An entry in said index structure for said data portion is provided. The index structure is accessed using said token value as a key to determine said entry in said index structure for said data portion. The entry is allocated to have a location in accordance with said token value.

17 Claims, 29 Drawing Sheets

OTHER PUBLICATIONS

Snap-Mirror®: File System Based Asynchronous Mirroring for Disaster Recovery, Hugo Patterson, et al., Proceedings of the FAST 2002 Conference on File and Storage Technologies, Monterey, California, USA, Jan. 28-30, 2002 (14 pp.).

*Matching Application Access Patterns to Storage Device Characteristics*, Jiri Schindler, May 2004, Doctoral Thesis, Dept. of Electrical and Computer Engineering, Carnegie Mellon University, May 2004 CMU-PDL-03-109 (194 pages).

*Maintenance-Free Global Data Storage*, Sean Rhea, et al., IEEE Internet Computing, Sep.-Oct. 2001, (pp. 40-49).

*Collision Search Attacks on SHA1*, Xiaoyun Wang, et al., Feb. 13, 2005.

*The Ubiquitous B-Tree*, Douglas Comer, Computing Surveys, Jun. 1979.

*The Ubiquitous B-Tree*, Marcel Adam.

* cited by examiner

| Number of servers "m" 602 | | | | | | | |
|---|---|---|---|---|---|---|---|
| Space availability of LUNs 604 | | | | | | | |
| Server 1 | Amount of memory | No. processors | Processor speed | .. | Server m | Amount of memory | No. Processors | Processor Speed |

POSITIONAL ALLOCATION

BACKGROUND

1. Technical Field

This application generally relates to data storage systems, and more particularly to techniques used with storing and accessing data on data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems and host or servers may be configured in a network arrangement referred to as a Storage Area Network (SAN). Operations, such as data backups and restorations, may be performed with respect to data for one or more of the servers. Various technologies may be used in connection with storing and retrieving the backup data such as a single instance storage (SIS) technology which performs data deduplication to eliminate redundant data. SIS technologies manage duplicate copies of content by keeping a single copy of the content and providing a reference or token to the single copy. The reference or token may be used to describe multiple instances of a same copy of backed up data such as may be present, for example, when backing up a same set of data at different points in time.

In connection with SIS technologies, it may be desirable to utilize techniques for efficiently storing and processing the data in connection with the various operations performed. It may also be desirable to have such techniques be scaleable in accordance with one or more variables or parameters of a system within which the SIS technologies are utilized.

SUMMARY OF THE INVENTION

In accordance with one aspect of the invention is a method for managing an index structure used to access data portions comprising: providing a token having a token value for a data portion; and providing an entry in said index structure for said data portion, wherein said index structure is accessed using said token value as a key to determine said entry in said index structure for said data portion, and wherein said entry is allocated to have a location in accordance with said token value. The index structure may be a B-tree index structure. The B-tree index structure may be partitioned into a number of index structures, each of said index structures being associated with a range of token values of data portions. The index structure may include a unique entry for each data portion and the data portion is stored in one or more data storage systems including only a single copy of each data portion, the entry including a reference count indicating a number of times the data portion is referenced in one or more data segments stored in said one or more data storage systems. The method may also include: determining an initial address of said entry in accordance with said token value of said data portion; and if said initial address identifies a first location already associated with another token value, determining a second address using a resolution technique identifying a next available location with respect to said first location. The entry may be allocated from an allocation space having a size determined in accordance with a maximum number of possible nodes in said index structure. A size of the allocation space may be selected to be a value in a range of 10% to 20% more than a size associated with the maximum number of possible nodes in said index structure. Each data portion may have a same fixed length. A cache size may be selected as an integer value larger than an average distance between locations of entries in said index structure which are out of order with respect to two token values corresponding to the entries, wherein a first of said token values is less than a second of said token values, and a first entry in said index structure associated with said first token value is allocated at a first location and a second entry in said structure associated with said second token value is allocated as a second location, the first location having an address which is greater than an address of the second location. A cache size may be selected as an integer multiple of said average distance between locations of entries in said index structure which are out of order with respect to two token values corresponding to the entries. The method may also include storing said data portion at a storage location, wherein said entry indicates said storage location of said data portion and said index structure is accessed using said token value as a key to determine said storage location of said data portion.

In accordance with another aspect of the invention is a method of storing data comprising: receiving a plurality of data portions and a corresponding token having a token value for each of the data portions; and updating an access structure to include entries for said plurality of data portions, wherein the access structure is indexed by token values of the data portions, each of said entries for each token value being located at an address determined in accordance with said each token value. The method may also include storing each of the data portions to a different storage location; Each of said plurality of data portions may have a same size, and each token value may be a hash value.

In accordance with yet another aspect of the invention is a computer readable medium comprising code stored thereon for managing an index structure used to access data portions, the code comprising for: providing a token having a token value for a data portion; and providing an entry in said index structure for said data portion, wherein said index structure is accessed using said token value as a key to determine said entry in said index structure for said data portion, and wherein said entry is allocated to have a location in accordance with said token value. The index structure may be a B-tree index structure. The B-tree index structure may be partitioned into a number of index structures, each of said index structures being associated with a range of token values of data portions. The index structure may include a unique entry for each data portion and the data portion is stored in one or more data storage systems including only a single copy of each data portion, the entry including a reference count indicating a number of times the data portion is referenced in one or more data segments stored in said one or more data storage systems. The computer readable medium may also include code for: determining an initial address of said entry in accordance with said token value of said data portion; and if said initial address identifies a first location already associated with another token value, determining a second address using a resolution technique identifying a next available location with respect to said first location. The entry may be allocated from an allocation space having a size determined in accordance with a maximum number of possible nodes in said index structure.

BRIEF DESCRIPTION OF THE DRAWINGS

Features and advantages of the present invention will become more apparent from the following detailed description of exemplary embodiments thereof taken in conjunction with the accompanying drawings in which:

FIG. 6 is an example representation of resource information regarding the resources available in a system for use in connection with the techniques described herein;

DETAILED DESCRIPTION OF EMBODIMENT(S)

Figure 1:
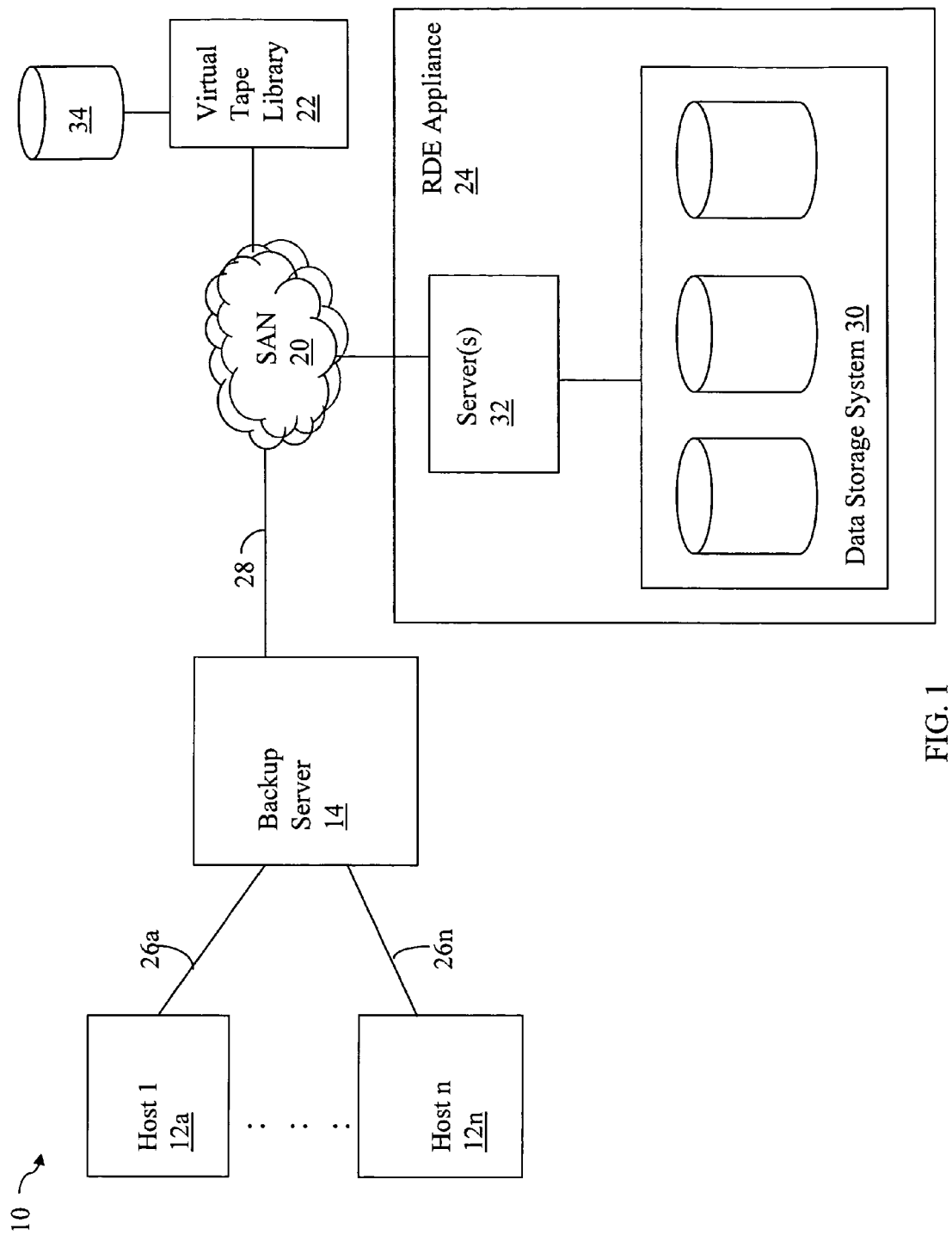
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes one or more hosts or servers 12a-12n and a backup server 14. The backup server 14 may perform operations, such as backup and/or restoration of data from one or more of the hosts 12a-12n. The hosts 12a-12n may communicate with the backup server 14 over respective communication connections 26a-26n. The backup server 14 may service the backup operation of host data by sending the backup data of the host to the virtual tape library (VTL) 22. The backup server 14 may communicate with the VTL 22 which is included in a SAN over communication connection 28. In one embodiment, the connection 28 may be a Fibre Channel connection and the connections 26a-26n may be Ethernet connections. The VTL 22 may be used in connection with performing a backup of the host data to one or more virtual tape devices. The virtual tape device provides users of the VTL 22 with the appearance of having data stored on tapes when the data is actually stored on one or more other non-tape devices, such as disks of 34.

In response to the backup request received by the VTL 22, the VTL 22 receives the host data. The VTL 22 may store the host data on one or more storage devices 34 of the VTL 22. At some subsequent point in time, the VTL 22 schedules a backup of the host data to the RDE (redundant data elimination) appliance 24 by communicating with one or more servers 32 of the RDE appliance 24, for example, over a network connection. The RDE appliance 24 may be characterized as including components which perform data deduplication to eliminate redundant data. The RDE appliance 24 may utilize single instance store (SIS) technologies to perform the foregoing when storing a received data set. As known in the art, SIS technologies manage duplicate copies of content by keeping a single copy of the content and providing a reference or token to the single copy. The reference or token may be used to describe multiple instances of a same copy of backed up data as described in more detail elsewhere herein. The RDE appliance 24 includes components that perform data reduction for the storage subsystem along with efficient data transmission techniques in the example system of FIG. 1.

The RDE appliance 24 may include hardware and/or software used in connection with servicing requests such as the request received from the VTL 22 to backup the host data from the VTL's device 34. The RDE appliance 24 may include one or more processors or servers 32 for use in connection with performing the techniques described herein.

The one or more data storage systems 30 may be used for storing the backed up data processed in accordance with the techniques described herein in connection with redundant data elimination as performed by the RDE appliance 24. In an embodiment described herein, the data storage system 30 of the RDE appliance 24 may contain the unique instances of content data and the related indexing and access structures. Each of the data storage systems of element 30 may include one or more data storage devices, such as disks. One or more data storage systems may be manufactured by one or more different vendors. Each of the data storage systems included in 30 may be inter-connected (not shown). Each of the data storage systems of element 30 may include a plurality of disk devices or volumes. The particular data storage systems and examples as described herein for purposes of illustration should not be construed as a limitation.

The disk drives of the data storage system 30 may be accessed using a logical partitioning of the physical devices into logical volumes (LVs) or logical units. The logical units may or may not correspond to the actual disk drives. For example, one or more logical units may reside on a single physical disk drive. An LV or LUN (logical unit number) may be used to refer to one of the foregoing logically defined devices or volumes.

Although specific examples and types of communication connections may be described herein, the communication connections used in an embodiment may be any one or more of a variety of networks or other type of communication connections as known to those skilled in the art. For example, the connections may be a network connection, bus, and/or other type of data link, such as a hardwire or other connections known in the art. The components of the example 10 may communicate, for example, over the Internet, an intranet, network or other wireless or other hardwired connection(s). Some or all of the connections by which the components of the example 10 use for communication may pass through other communication devices, such as a Connectrix, Fibre Channel, or other switching equipment that may exist such as a phone line, a repeater, a multiplexer or even a satellite.

The processors included in the host computer systems 12a-12n, the RDE appliance 24 and other components in the system 10 may be any one of a variety of proprietary or commercially available single or multi-processor system, such as an Intel-based processor, or other type of commercially available processor able to support traffic in accordance with each particular embodiment and application.

It should also be noted that each of the components included in the example 10 of FIG. 1 may all be located at the same physical site, or, alternatively, may also be located in different physical locations. The particular communication connections used may also vary in accordance with the location of the components in a system.

As described above, the VTL 22 may issue a request for a data backup to the RDE appliance 24 in accordance with a previously received request and data from a host. In connection with the techniques described herein, a data pull model may be utilized with the data source located on the VTL 22 and the target located at the RDE appliance 24. This is in contrast to existing systems which may utilize a data push model in which the data is pushed from the VTL 22 to the RDE appliance 24. In connection with existing systems utilizing the data push model, the data may be pushed to the RDE appliance 24 at a rate faster than the RDE appliance 24 is capable of processing the data often causing a bottleneck.

As will be set forth in following paragraphs, the techniques described herein provide for efficient processing of the data at the RDE appliance 24 utilizing a data pull model in which RDE appliance 24 schedules and controls or drives the data transfer from the VTL 22. The RDE appliance 24 requests the data in accordance with a rate at which the RDE appliance 24 processes the received data. Additionally, an embodiment of the RDE appliance 24 may utilize any one or more of the different techniques described herein for efficient processing of the received data. Such techniques may relate to scheduling, caching, the incoming data stream and data access structures. In connection with scheduling, the data pull model allows the RDE appliance 24 to drive the data transfer process by requesting data in accordance with a schedule. The schedule is determined by components of the RDE appliance 24 in accordance with current resources of the RDE appliance 24. Described in following paragraphs are structures that may be used in connection with the incoming data stream and data access. Also described herein are techniques that efficiently utilize the foregoing structures in connection with operations performed in a SIS implementation. In connection with caching, techniques are described herein which may provide for more efficient processing of a received data set, for example, by pre-populating the cache with information associated with other previously processed data sets.

In connection with the techniques described herein, common portions of content or data are detected to eliminate redundant data. Data redundancy may occur in a system for a variety of different reasons. The amount of data redundancy may occur at one or more levels of granularity (e.g., within a file, across several files, and across data from multiple systems and servers) and may vary in accordance with the particular data or content and use of the data. A first source of data redundancy may occur within a data file. For example, a single file may repetitively use the same words or phrases. If snapshots of the data within the file are taken at various points in time, as may be the case in connection with successive backups of the file, there may be common portions of the file which appear in each of the backed up copies of the file. The same file may also occur on more than one system. Such may be the case, for example, when two email users receive the same email attachment on different systems. Systems using the same operating system or being used for similar purposes may also have one or more files which are common. For example, two servers having the same operating system may have common files. Two systems or sets of backup data used by a same corporate group such as engineering, human resources, or finance may have common files such as, for example, the same applications. For example, one or more systems used in connection with finance may have the same financial applications.

Changes may also be characterized as aligned or unaligned with respect to a data block boundary. Aligned changes may be characterized as being of a fixed length and occurring on such a boundary. Unaligned changes may be characterized as variable length data insertions and deletions causing changes to an existing set of data. For example, edits performed by a human to a file may be unaligned if the edit changes a few characters in the middle of the file. Edits may also be aligned, for example, if the amount of change is larger and/or rounded out to the nearest block boundary. When examining any two sets of data, any portion that has not changed is common. SIS techniques focus on finding such common portions or the differences between the two sets.

In connection with the techniques described herein, a data element, such as a file, may be partitioned into one or more atomic units. Each such unit may be the same size or of varying sizes. A hash value may be computed for each atomic unit of a data set. The hash values may be used in detecting differences or changes between data sets as described in more detail in following paragraphs. Use of a fixed length block size may provide for more efficient CPU usage than an embodiment in which the atomic unit size for which a hash value is formed may vary.

As such, an embodiment utilizing SIS technologies may select an approach in accordance with the types of changes expected. For example, a fixed length block size may be selected for use in a system. Such a decision may be made, for example, if the data being stored is subject to the forgoing aligned case. Fixed length and aligned blocks may facilitate better scaling in accordance with system bandwidth and storage although the maximum compression may not be obtained. The particular block size selected may vary with embodiment.

An embodiment utilizing SIS technologies may also select a variable length block size for discovering common content between data sets, for example, if the data sets are expected to be as in the unaligned case described above at the cost of expending more system bandwidth to process the incoming data stream since such systems may be more CPU intensive.

In connection with the techniques herein, an embodiment is described which utilizes a fixed length block size as the atomic unit for detecting changes as may be used in a system which expects block aligned changes. The block size may be, for example, 4 KB, 8 KB, or 16 KB. In such systems, the fixed block size facilitates a sufficient level of compression of the original data sets while also providing a scaleable approach in accordance with storage and CPU resources. The particular fixed block size selected may vary with embodiment and may be determined using, for example, empirical testing or sampling of expected input data streams. An embodiment utilizing the techniques described herein may have a fixed length block size as the unit for partitioning data. However, it should be noted that this should not be construed as limitation of the techniques described herein. An embodiment may, for example, utilize a fixed length block size for most data and selectively utilize a varying block size on certain sets of received data in accordance with one or more other criteria, such as higher compression rates due to storage space limitations, that may vary with an embodiment. Additionally, it will be appreciated by one skilled in the art that one or more of the techniques described herein may also be used in an embodiment in connection with forming hash values for portions of varying size.

An embodiment utilizing the techniques described herein may be use a single fixed block size, such as, for example 4 KB, or select from one or more block sizes occurring on defined boundaries such as, for example, 4 KB, 8 KB, or 16 KB. The techniques described herein may also be used in connection with block sizes of other lengths, for example, not occurring on a 4 KB boundary as described above. However, in such embodiments, additional overhead may be incurred in connection with implementation of the techniques herein.

Figure 2:
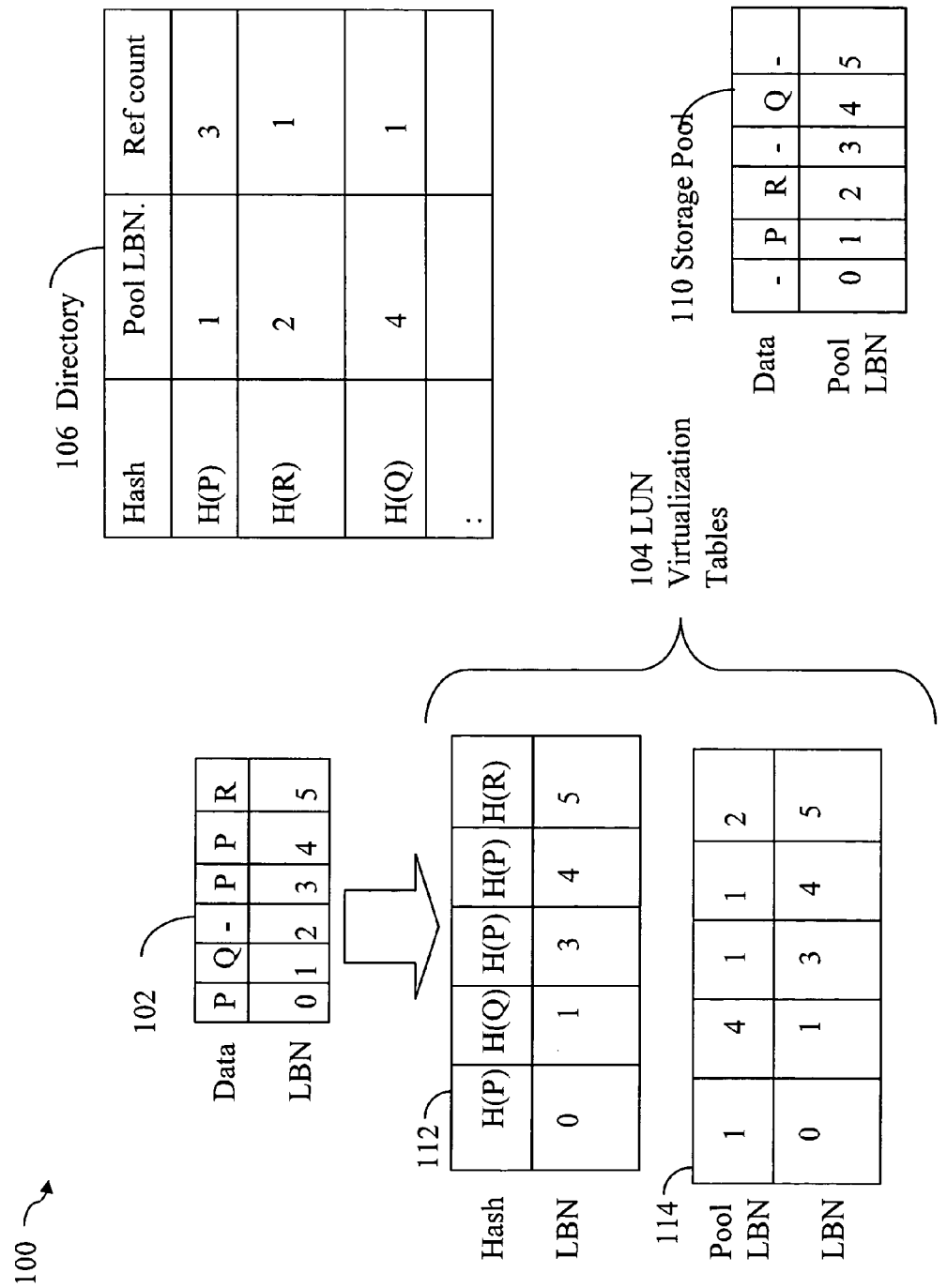
FIG. 2 is an example of an embodiment of data structures that may be used in connection with the techniques herein for storing data in accordance with a single instance storage (SIS) technique.

Referring now to FIG. 2, shown is an example representation illustrating data structures that may be used in connection with the techniques described herein. The example 100 includes a data segment 102, LUN virtualization tables 104, a directory structure 106, and a global pool 110. The LUN virtualization tables 104 include tables 112 and 114. The data segment 102 may be partitioned into various partitions or portions of data as represented by the letters P, Q and R. The data segment 102 may be, for example, data from one or more files, a specified segment of data from a device, and the like. For purposes of illustration, a portion of data which is duplicated in one or more locations in 102 includes the same letter. For example, the data segment 102 includes three data portions which are the same as denoted by the letter P. In connection with the techniques described herein, a token, signature, or reference uniquely representing each of the data portions is obtained. In one embodiment, the token or reference is a hash value obtained using a hashing function, such as a cryptographic hashing function. Examples that may be used in an embodiment include, for example, the MD-5 and SHA-1 hashing algorithms. The size of the hash value used in connection with the techniques described herein may with embodiment. In one embodiment, a hash value which is 20 bytes in length may be used.

A data segment 102 may be represented or virtualized using the one or more hashes corresponding to the portions of the segment 102. In connection with the techniques described herein in one embodiment, a received data segment 102 is partitioned into fixed portions as illustrated by 102. In the example 100, the size of each portion may be 4 KB or the size of one logical block. Each logical device, such as an LUN, may include multiple blocks and a location on the LUN may be represented by a logical block number (LBN) corresponding to an offset value which is multiple of the block size for the LUN (e.g, offset=LBN*block size). In this example, the data segment 102 includes 6 LBNs numbered 0 . . . 5, inclusively. A hash value for each of the data portions, such as each of LBN's of 102, may be determined as represented by 112. It should be noted that at LBN 2, there is no data stored and in the representation 112, such unused data portions may be omitted. The representation 112 includes a map of each LBN of data (e.g., P, Q, R) and its corresponding hash value (e.g., denoted H(P), H(Q), and H(R), respectively). The representation 112 is one form of virtualization of the data segment 102.

When a program, such as included in the VTL 22, stores data using the techniques described herein, the RDE appliance 24 may generate a corresponding list of one or more hash values, such as illustrated by 112. The RDE appliance 24 stores a single instance of each unique data portion, such as each LBN, and returns a list of the hash values 112 to the program. For example, the RDE appliance 24 stores 3 unique data portions or partitions P, Q and R for the data segment 102.

In connection with storing the actual content or data, the RDE appliance 24 may allocate storage for the data from a data storage pool comprising one or more data storage devices. When a data segment is received, it is partitioned and the hash value for each portion is determined as described above. Each unique portion is stored in the storage pool 110 at a location (e.g., pool LBN). The hash value and the pool LBN of the data are recorded along with a reference count in a directory 106. The directory 106 includes an entry for each such unique data portion. The reference count indicates how many times the unique data portion is referenced or occurs in one or more data sets received by the RDE appliance 24 for storage. For example, the directory 106 illustrates the contents of the directory 106 for the data segment 102. Thus, only three LBNs of data are actually stored to represent the segment 102.

The directory 106 may be indexed by hash value determined for a data portion of a fixed size. In connection with the example 100, H(P) is the first element in the specified hash range of the directory 106, H(R) is the second such element and H(Q) is the third element in the hash range. An embodiment may utilize any one or more different structures to implement the directory 106. As will be described in more detail in following paragraphs, an embodiment may divide the directory structure 106 into partitions for use in connection with techniques herein. As also described in connection with examples herein, the directory structure 106 may be characterized as an access structure used in connection with storing and retrieving data portions. The directory structure 106 is an index structure in which the index keys are the hash values. The directory structure 106 may be implemented using any one of a variety of different data structures. Particular examples are described in connection with examples herein.

As will be appreciated by those skilled in the art, it should be noted that a hash collision may occur when two different data portions generate the same hash using a given hash algorithm. However, depending on the hashing algorithm, size of the data portions, and the size of the hash value, the probability of a hash collision may be non-zero but extremely small. For example, in one embodiment in which the RDE appliance 24 can store a maximum of 256 TB of data, hashing may be performed using the SHA1 hashing algorithm with a fixed portion size of 4 KB to generate a hash value of 20 bytes. In such an embodiment, the probability of a hash collision may be less than $2^{-124}$. As such, the probability of a collision is so small that probabilistically, the hardware may fail prior to having such a collision. Thus, an embodiment may select values and algorithms for use in connection with the techniques herein so that hash collisions are not a practical concern given the foregoing probabilities.

Element 110 represents the storage pool where the data portions are stored. It should be noted that the pool LBN represents a LBN of a LUN used to store the data portions. In an embodiment in which multiple LUNs are used to store the data portions, the pool LBN may be denoted to include the LUN as well as the LBN as may be illustrated in connection with other examples herein.

It should be noted that the element 114 represents another virtualization of the data segment 102 that may be used to uniquely identify each data portion or partition. Rather than use the hash value as the token or reference to the data portions, the pool LBN or location in the storage pool may be used.

When a program stores data at the RDE appliance 24, a virtualized representation of the data segment 102, such as illustrated by 112 or 114, may be generated. The virtualized representation may be used to later retrieve the actual data from the RDE appliance 24. When presented with the virtualized representation of the data segment, the RDE appliance 24 may fetch the actual content or data and return the data segment 102. Once a data portion or partition is stored, the data remains at the location in the storage pool while the reference count is non-zero. When the reference count is zero, it means that the data partition is no longer referenced in any data stored in a data storage system of the RDE appliance 24 and may be deleted.

In connection with techniques described herein, a virtualized representation of data segments, such as a files, may be used to determine differences between data segments, writing subsequent data segments, and retrieving data for previously stored data segments.

Figure 3:
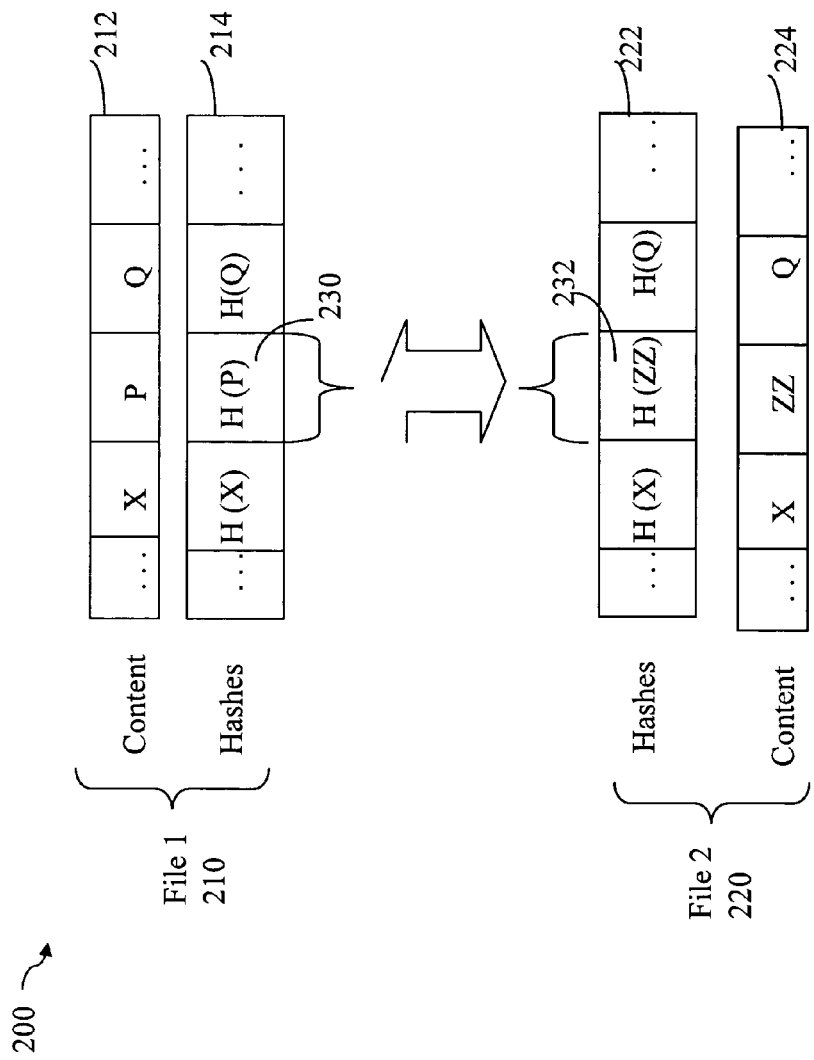
FIG. 3 is an example illustrating use of a virtualized representation and comparison of two files.

Referring now to FIG. 3, shown is an example illustrating a virtualized representation and comparison of two files. A first file 210 may have content 212 and may be represented using the virtualized representation 214. A second file 220 may have content 224 and may be represented using the virtualized representation 222. The virtualized representations 222 and 214 may be generated, for example, by the RDE appliance 24 in response to a request from the VTL to store files 210 and 220. The virtual representations 214 and 222 may be compared to determine which portions of the two files 210 and 220 are different. With reference to FIG. 3, the portions 230 of file 210 and 232 of file 2 differ. File 210 may be a file at a first point in time and file 220 may be a different version of the same file at a subsequent point in time. For example, a first backup data set may include file 210. At a later point in time, a second backup data set including file 212 may also be stored in the RDE appliance 24. Using the techniques described herein, storage allocated for use with storing file 210 and 212 may be reduced. The data portions of file 210 may be stored when the first backup set is stored. When the second data set is stored, only the additional new data portion 232 is stored.

Additionally, a performance benefit can be realized by the RDE appliance 24 in connection with processing associated with the second file 212. Using the techniques herein, a comparison can be made of the hash values for the data portions of file 212 to those hash values in the directory structure to determine if there is a need to store any data portions. If the hash values are already in the directory structure 106, then there is no need to store the data portion. The lookup and comparison of hash values is efficient. If the data portion already has an existing entry in the directory, the reference count is accordingly incremented rather than writing out the data portion which is already included in the storage pool. When storing the file, the data contents may be stored in the storage pool in portions and the virtualized representation may be stored to represent the file, for example, of a backup data set.

What will now be described are techniques that may be used in connection with performing a backup or storing of data to the RDE appliance 24. As described elsewhere herein, an embodiment may use a data pull model in which the RDE appliance 24 controls the sequencing of data sent to it. Additionally, as described below in the embodiment herein, the RDE appliance 24 may include a scheduler component which determines a processing schedule for a set of data to be stored. The scheduler may reside on one of the servers 32 of the RDE appliance 24 as illustrated in FIG. 1. The set of data may include, for example, one or more tapes. The scheduler may determine a processing schedule in accordance with one or more attributes of each tape. It should be noted that although a tape may be associated with the unit of scheduled or requested data, an embodiment may perform scheduling using other such units in accordance with the particular devices of a data source and the data set being stored.

Figure 4:
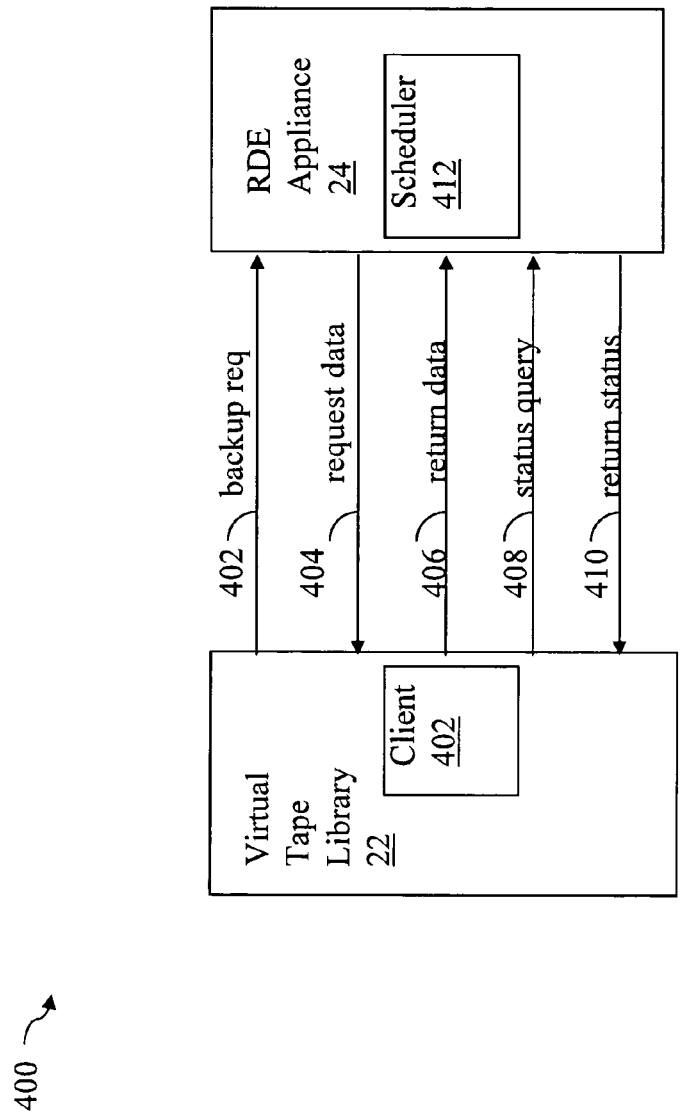
FIG. 4 is an example of an embodiment of communications that may be exchanged in connection with a data pull model and to obtain the status of a job request using the techniques described herein.

Referring now to FIG. 4, shown is an example 400 illustrating a protocol of communications as may be exchanged between the VTL 22 and the RDE appliance 24 in connection with a request for storing data to the RDE appliance 24. In the example 400, the VTL 22 may include a module or component that may be characterized as the client 402 in connection with the request to store data using the data pull model. The RDE appliance 24 may include a scheduler 412 which controls or drives the data pull by requesting data from the VTL 22 in accordance with a schedule. The scheduler 412 may generate the schedule in accordance with currently available resources of the RDE appliance 24. The determination of the schedule is described in more detail in following paragraphs.

The VTL 22 may issue a backup request 402 to the RDE appliance 24. The scheduler 412 determines a schedule for the backup request 402 and may in turn issue a request 404 to the VTL 22 for the data to be backed up and stored at the RDE appliance 24. The VTL 22 may return the requested data portion as illustrated by 406. It should be noted that the communications represented by 404 and 406 may occur multiple times in accordance with the rate at which the RDE appliance 24 processes the received data and in accordance with a sequencing or ordering as determined by the scheduler. At a point in time while the RDE appliance 24 is servicing the request of 402 or after completion of such servicing, the VTL 22 may query the RDE appliance regarding the status of the request of 402 as illustrated by element 408. In response, the RDE appliance 24 may return a status communication as indicated by element 410. It should be noted that, as will be described in following paragraphs, an embodiment of the scheduler may be unable to service or complete processing associated with a request 402 for any one of a variety of different reasons. In such instances when a status query 408 is performed, the returned status of 410 may indicate the inability to complete or process the request and may also identify the reason.

In the request 402, the VTL 22 may provide a variety of different information used by the scheduler in determining a processing schedule.

Figure 5:
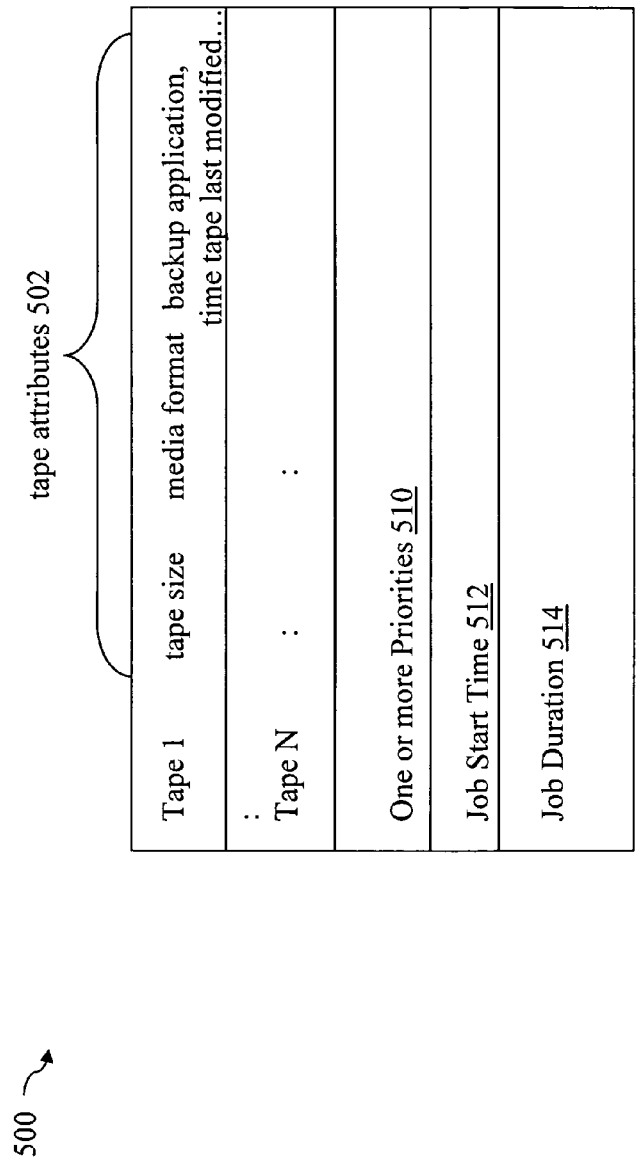
FIG. 5 is an example representation of a request that may be received by the RDE (redundant data elimination) appliance of FIG. 1.

Referring now to FIG. 5, shown is an example representation of a request that may be received by the RDE appliance 24. The request of the example 500 may be sent by the VTL 22 as illustrated by element 402 of FIG. 4. In this example, the backup request is a request to back up one or more tape devices to the RDE appliance 24. The backup request of the example 500 includes information about one or more of the tapes to be processed. Such information may include one or more attributes regarding each of the tapes. In the example 500, one or more tape attributes 502 may be specified for each of the N tapes of the backup request. The attributes may include, for example, tape size, media format, information identifying the particular backup application that created the tape, time the tape was last backed up, time the tape was last modified, and/or possibly other metadata information regarding the tape. As will be described in following paragraphs, the scheduler 412 may use one or more attributes regarding each tape to determine the schedule for processing each of the N tapes. The particular attributes included in a request may vary with each request and embodiment.

In one embodiment, the tape size as included in a request may indicate the size (e.g., number of bytes of data) on a corresponding tape. The media format may indicate the type of virtualized tape or cartridge being emulated. The backup application that created the tape may indicate a particular backup format used in connection with creating the data stored on the tape.

A request may also include one or more other parameters such as one or more priorities 510, a job start time 512, and a job duration 514. In connection with a priority 510, a request may specify that one or more of the tapes included in the request are to be serviced with a particular priority. The priority may be used to indicate or force a processing order of the tapes. In other words, the priority may be used to indicate an ordering dependency that should be considered by the scheduler when determining the processing schedule. It should be noted that in an embodiment, the one or more priorities of 510 may indicate a required priority as well as a desired priority. In the event that a request indicates a required priority, a backup request may not be serviced if such a specified priority cannot be scheduled. If a request includes a desired priority, the scheduler may perform processing to determine a schedule in accordance with the desired priority. However, if the scheduler is unable to determine a processing order of the tapes in accordance with the desired priority and determines an alternate processing order, the alternate processing order may be utilized in connection with servicing the request. The element 510 may include a priority and also one or more tapes associated with the named priority.

A job start time 512 may indicate a time at which the tape processing of the request begins. The job duration 514 may indicate a maximum amount of time that may be allocated to process the tapes associated with the request. In one embodiment, a request may minimally specify the tapes to be processed and indicate the size of each tape. The particular requirements of each request may vary in accordance with each embodiment.

The scheduler may use one or more of the tape attributes to determine a processing schedule for the tapes. For example, in one embodiment, tapes of equal size and having one or more attributes indicating a common data source may be scheduled for processing at a same time. In one embodiment, the one or more attributes may be used to schedule tapes for processing at a same time if the tapes are expected to complete at approximately the same time given a same amount of resources. The scheduler determines the processing schedule, using the information of the request, and also using information indicating an amount of resource availability and capacity within the RDE appliance 24.

Referring now to FIG. 6, shown is an example 600 of resource information of the RDE appliance 24 that may be used by the scheduler in connection with determining a processing schedule. The resource information may include a number of servers 602, the number of available LUNs and associated storage availability 604, and information regarding the resources available on each of the servers as indicated by 606a-606m. For each of the servers, resource information utilized by the scheduler may include the amount of RAM or physical memory available, the number of processors, and the speed of the one or more processors. Other embodiments may consider one or more of the foregoing, as well as other resources, of the servers.

The quantity represented by element 604 may be a dynamic value which is updated in accordance with changes to the number of available LUNs and/or the amount of storage available in the data storage system 30 for use in connection with storing data. The information represented by element 604 may include the number of LUNs available as well as a total indicating the total amount of currently available storage across the number of available LUNs. As additional data is stored or deleted, the total amount of storage available across the available LUNs may be accordingly updated. Similarly, as LUNs are added or removed, the number of available LUNs may be accordingly updated. The information of element 604 may also include information on each of the individual LUNs used in connection with storing data. For example, the amount of currently available storage of each LUN may be specified in the resource information used by the scheduler.

In connection with techniques described herein, the number of LUNs available may be used in determining how many tapes each server is able to process. As will be described in more detail in the following paragraphs, a scheduled process may process a single tape and may be allocated one or more LUNs for its exclusive use while processing the tape. Each such process may be allocated at least one LUN for its exclusive use while processing a tape. In one embodiment, in accordance with other techniques described herein, the scheduler will not schedule more than N tapes for processing at the same time in a system in which there are N LUNs available.

Elements 606a-606m set forth the resources of each server available in the RDE appliance 24 for use in connection with processing data. In the example 600, element 606a identifies the resources of server 1. The resources may include the amount of memory, the number of processors and the speed of each processor in the server.

Figure 7:
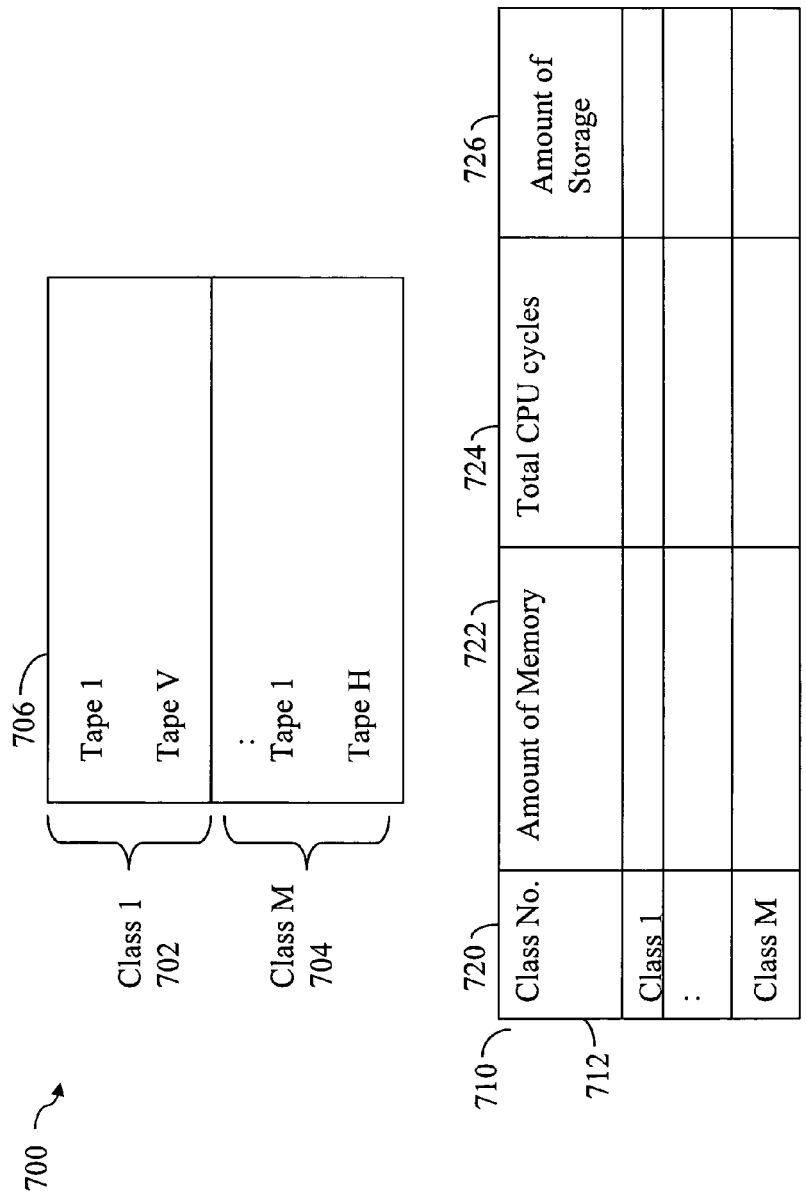
FIG. 7 is an example representation of additional data structures that may be used by the scheduler in connection with scheduling.

Referring now to FIG. 7, shown is an example of additional data structures that may be used by the scheduler in connection with scheduling. Element 706 represents a data structure including one or more classes or groupings of tapes. Element 710 represents a data structure including resource cost information or the amount of estimated resources it takes to process one unit of a tape of a particular class.

Element 706 represents the partitioning by the scheduler of the tapes of a request into one or more classes based on one or more tape attributes. For example, a request may only specify tape size for each tape. The partitioning based on class in such an instance may be based solely on the tape size attribute. If the request specifies tape size and backup application, the partitioning may be based on one or more of these two attributes.

Table 710 is a resource cost table providing a cost estimate for processing a unit of a given class of tape. Table 710 may include a row of resource costs for each defined class based on one or more tape attributes. In one embodiment, the unit cost may be expressed as the cost for processing one gigabyte of data of a particular class of tape. In the table 710, each row may represent one or more elements of cost information for processing a unit of a particular class of tape. In this example, the cost information includes the amount of memory 722, the total CPU cycles 724, and the estimated amount of storage 726. It should be noted that the costs included in each entry of the table for a given class may be based on estimations determined using any one or more different techniques including, for example, empirical determinations based on sample data, observations over a period of time, and the like. For example, the amount of estimated storage 726 may consider the amount of expected data compression obtained as a result of using the SIS techniques. The amount of expected compression may vary in accordance with the tape data source as may be indicated by one or more tape attributes such as, for example, backup application and media format.

As used herein, a single request for a data backup may be referred to as a request for a job. Based on the tape attributes in the request, the scheduler determines which one or more defined classes as may be included in an embodiment are relevant for the current request. The scheduler processes the request and groups or partitions the tapes together in one or more defined classes in accordance with one or more tape attributes of each tape. This grouping of tapes per class may be represented as the information included in 706. Based on the class partitioning in 706, any optionally specified priority, and resource information (e.g., cost (table 710) and availability (table 600)), the scheduler determines one or more batches of tapes to be processed at a same time. The processing of a single tape in a batch may be referred to as a tape process or task.

As described elsewhere herein, the request may also include other tape metadata information including one or more attributes indicative of the tape data source. The tape data source attributes may be characterized as one or more attributes related to how the data included on a tape has been generated. The scheduler may use the data source attributes in connection with scheduling tapes to schedule tapes in a same batch having one or more common tape data source attributes. Other tape data source attributes or metadata information that may be specified in a request may include, for example, the type of organization or activity of the organization which generated the tape. The organization may include, for example, engineering, finance, security, human resources, and the like. The use of one or more data source attributes may be used in connection with the affinity caching techniques described elsewhere herein.

An embodiment may specify one or more scheduling criteria indicating characteristics used in determining a processing schedule. As such, the scheduling criteria may be used in determining how to batch or group tapes for processing. Scheduling criteria may be specified to include, for example, backing up one or more tapes in a same batch in which each tape should take approximately the same amount of time to complete, use approximately the same of one or more resources, and the like. The scheduling criteria may be used to affect the scheduling algorithm, what tapes are included in what batches, and the processing order of batches. The scheduling criteria may include, for example, to schedule the longest jobs together in one or more same batches and that batches of the longest jobs are to be scheduled prior to other batches having shorter estimated duration times. The particular scheduling criteria may vary with each embodiment.

In one embodiment, the scheduler may not include tapes of different priority classes in a same batch. The higher priority tapes are scheduled for processing first in one or more batches prior to any remaining tapes of a lesser indicated priority or otherwise not having any indicating priority. The scheduler may also schedule a single tape process for each available server and allocate or bind at least one LUN for exclusive use by the process. The particular one or more LUNs allocated for processing of a tape may be determined in accordance with the estimated amount of storage for the tape. For example, using the information in table 710, a total storage estimate for storing data from a tape may be determined. The total storage estimate may be used in determining which one or more LUNs to allocate.

In one embodiment, the scheduler may determine the total costs for processing each tape in a job. The total costs may be based on one or more resources as included in the table 710. In an embodiment, given a same amount or constant amount of resources (e.g., processors of a same speed), an estimated duration time for each tape process may be determined. The scheduler may determine an ordering based on total expected processing time for each tape. For tapes having a same priority and class, those tapes having approximately the same estimated duration time (e.g., estimated duration time +/−some window of time) may be scheduled in one or more batches. As described herein, the number of batches and the particular tapes included in each batch may vary in accordance with the available resources. Within each batch, the tape processes may be scheduled for processing at a same time. As such, each tape process may be assigned a CPU and one or more LUNs. The number of tape processes in a batch may be based on the number of available LUNs and the number of processors. In one embodiment in which there are X processors, up to X tapes may be scheduled for processing. However, whether there are X tapes scheduled may also depend on the number of available LUNs. In connection with utilizing other techniques herein, at least one LUN is allocated for exclusive use by a tape process. If such a LUN is not available for exclusive use by a process, no additional tapes are scheduled for processing in a same batch independent of whether there is an available processor.

Figure 8:
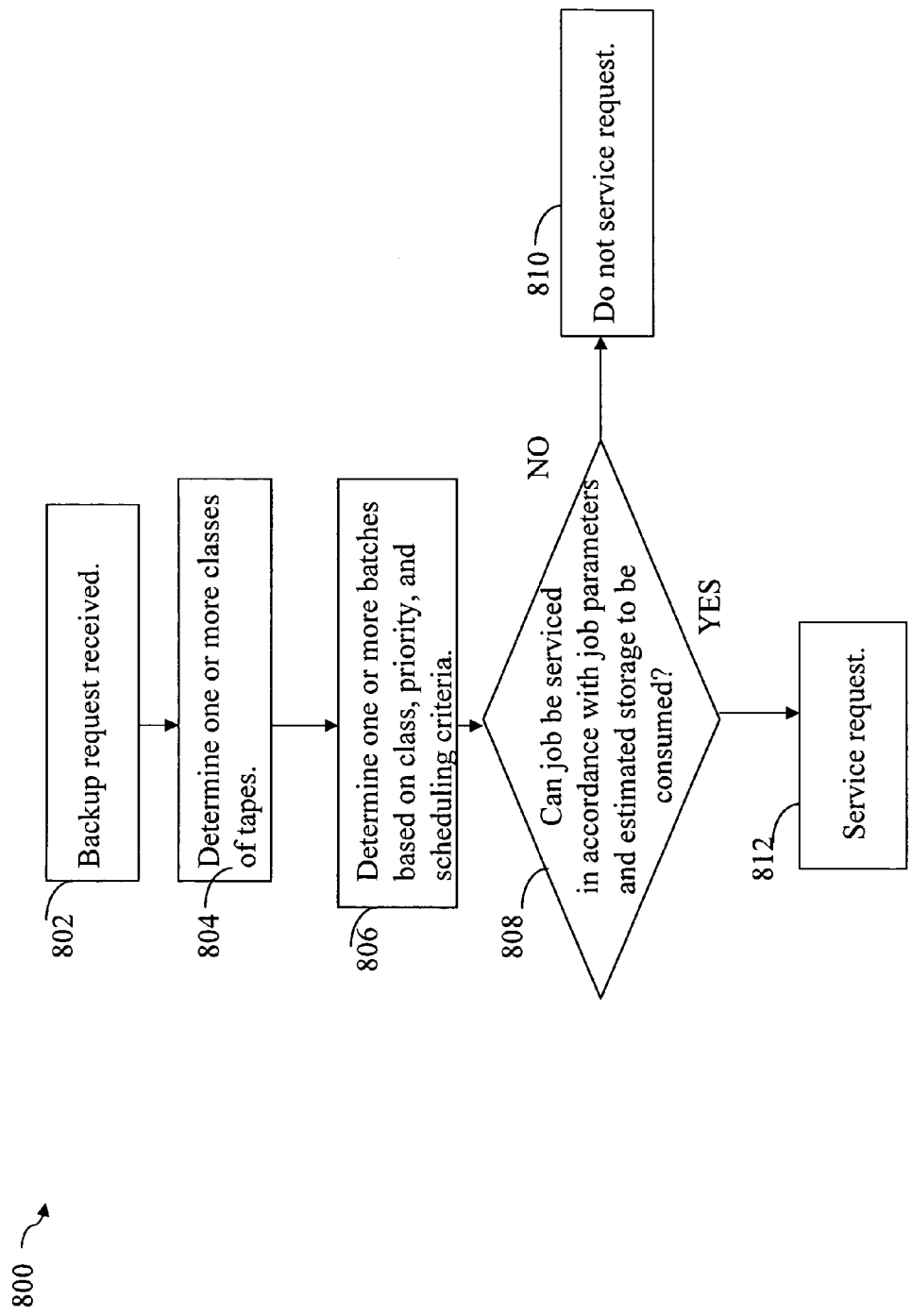
FIGS. 8 and 9 are flowcharts of processing steps that may be performed in an embodiment in connection with performing scheduling.

Referring now to FIG. 8, shown is a flowchart of processing steps that may be performed in an embodiment in connection with determining a schedule of tape processing. The steps of flowchart 800 may be performed by the scheduler. The steps of flowchart 800 generally summarized processing just described. At step 802, a backup request is received. At step 804, one or more classes of tapes are determined. As described above, the one or classes may be determined in accordance with one or more tape attributes included in the request received at step 802. The classes included in an embodiment may be one or more defined classes for which resource information is specified, for example, as in table 710. At step 806, one or more batches of tapes to be processed are determined based on class, priority, and one or more scheduling criteria. At step 808, a determination may be made as to whether the job can be serviced in accordance with the specified job parameters and estimated storage to be consumed. Such a determination at step 808 may be characterized as a high-level determination based on one or more job-related characteristics. For example, part of step 808 processing may be to determine whether the request received at step 802 indicates a job start time and duration which may overlap with another job that has already been scheduled or which is already executing. Step 808 processing may also include, for example, making a determination as to whether the total amount of estimated storage needed to service the request is more than the amount of currently available storage in the RDE appliance 24. The particular considerations of step 808 processing may vary in accordance with an embodiment. If step 808 determines that the job cannot be serviced in accordance with specified job parameters and estimated storage to be consumed, control proceeds to step 810, where a determination is made not to service the request. If step 808 evaluates to yes, control proceeds to step 812 to proceed with processing to service the request in accordance with the determined schedule.

Figure 9:
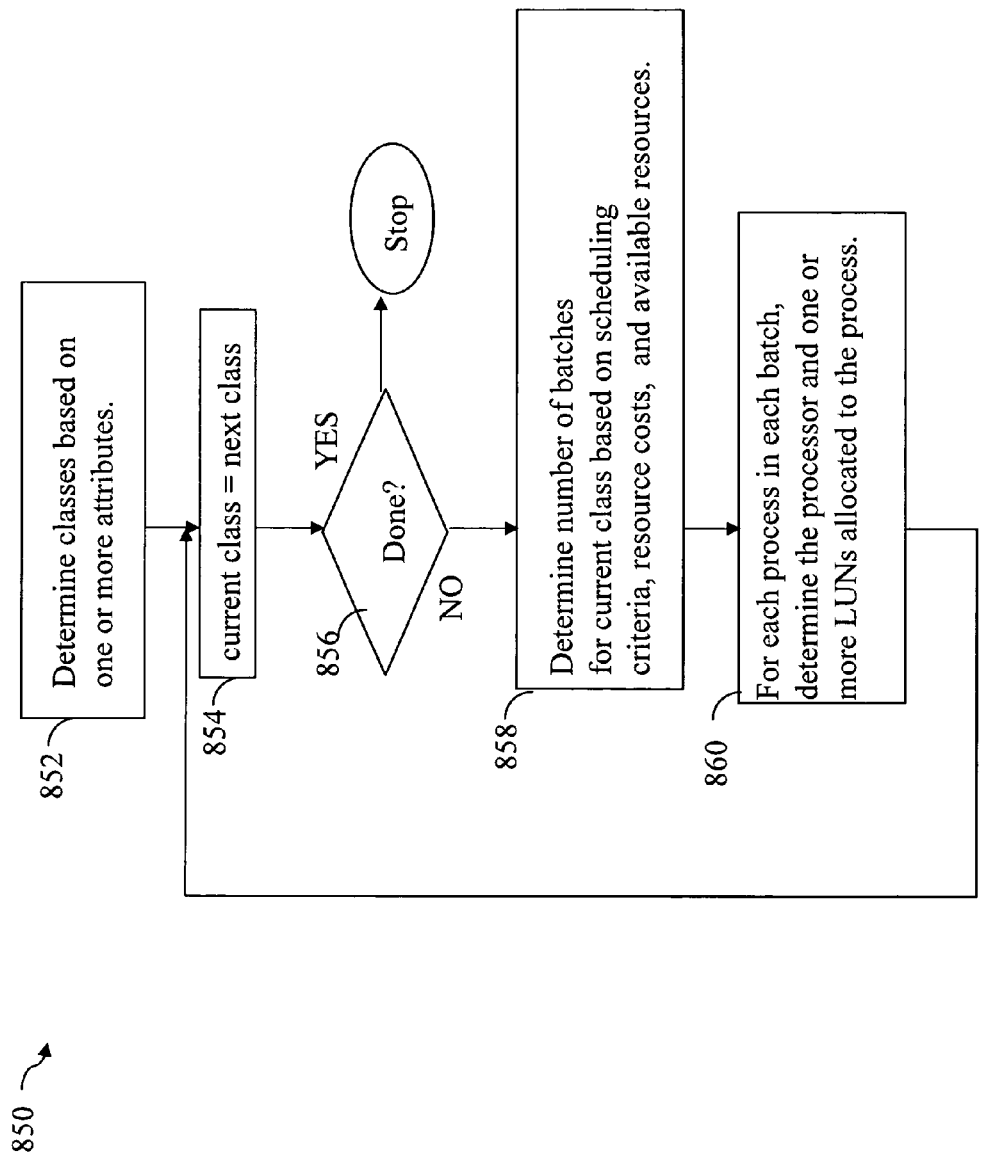

Referring now to FIG. 9, shown is a flowchart of processing steps that may be performed by the scheduler for scheduling tapes of each priority that may be specified in a request. The processing of flowchart 850 may be characterized as more detailed processing that may be performed in an embodiment in connection with step 806 of flowchart 800. At step 852, one or more classes are determined for tapes of the priority currently being processed. As described elsewhere herein, the classes may be determined based on one or more tape attributes such as size and/or backup application as well as other tape metadata that may be included in the request. At step 854, a variable current class is assigned to the next class to be processed. At step 856, a determination is made as to whether all of the tape classes have been processed. If so, processing stops. Otherwise, control proceeds to step 858 to determine one or more batches for the current class based on scheduling criteria, resource costs, and available resources of the RDE appliance 24. At step 860, for each process in each batch, a particular processor and one or more LUNs are allocated for exclusive use by each process for the duration of the batch. It should be noted that the particular LUNs allocated to a process may vary in accordance with the amount of available storage on each of the available LUNs. From step 860, control proceeds to step 854 to continue processing with the next class until step 856 indicates that processing has been performed for all of the tape classes.

It should be noted that an embodiment may schedule tapes of one or more classes within a same batch as well as other variations from processing described in flowcharts 800 and 850. The techniques described herein for scheduling batches of tapes in accordance with one or more attributes and resource information (e.g., availability and costs) may be used in an embodiment with any one or more different scheduling algorithms. As will be appreciated by those skilled in the art, the example scheduling algorithm and variations set forth herein should not be construed as a limitation of scheduling in accordance with one or more tape attributes, available resources, resource costs, and/or scheduling criteria as may be used in connection with other scheduling algorithms.

In one embodiment, classes may be determined based on the tape size attribute. Those tapes which are of the largest size may be determined to have the longest estimated duration or processing time. Those tapes having approximately the same tape size (e.g., tape size +/−window size) may be determined to also complete at approximately the same time. At step 858, in connection with deciding which one or more tapes of a same size to include in a single batch, secondary attribute criteria may be used if specified. Tapes having one or more attributes, for example, indicating a same data source may be included in a same batch. Those batches of tapes having the longest estimated duration (e.g., largest size) may also be scheduled prior to other batches of tapes having shorter estimated durations.

Figure 10:
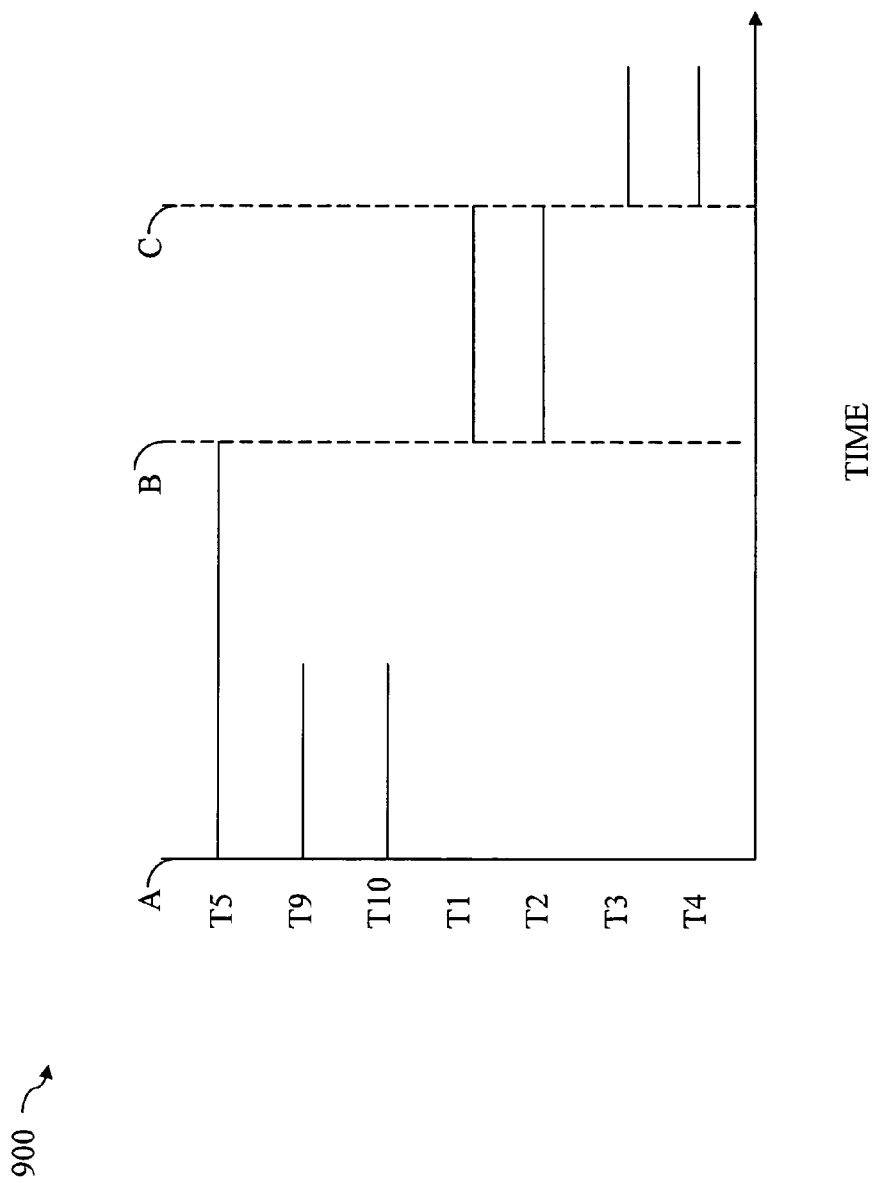
FIG. 10 is a graphical illustration of scheduled tape processing using the techniques described herein.

Referring now to FIG. 10, shown is an illustration of scheduled processes in accordance with a schedule determined for a job request. The example 900 is one graphical illustration of the schedule that may be determined using the techniques herein. In connection with the example 900, the associated job request may include tape attribute information for tapes 1, 2, 3, 4, 5, 9, and 10. The request may specify that tapes 5, 9, and 10 have priority 1 (e.g., highest priority). Tapes 1 and 2 have priority 2. Tapes 3 and 4 have priority 3 (e.g., lowest priority). Based on the resources available and resource costs, the scheduler determines that tapes 5, 9, and 10 of the first priority may be included in the first batch. Processing of the first batch begins at time A and ends at time B. In this embodiment, tapes of priority 2 and 3 are not scheduled for processing within the same batch as tapes of priority 1. As such, tapes of the second priority will not begin until the batch of the first priority tapes have completed at time B. It should be noted that resources allocated for use with processes of a first batch are available for reuse in connection with a subsequent batch when the first batch processing has completed. The scheduler determines that tapes of priority 2 are processed in a single batch beginning at time B. Tapes of priority 3 begin at time C.

What will now be described are data structures that may be used in connection with the techniques described herein.

Referring back to FIG. 2, illustrated is a directory structure 106 and a storage pool 110. Processing of each partitioned data portion for which a hash value is determined includes two sets of processing steps. A first set of processing steps may be associated with a first stream, the data stream, for storing the actual content of the data portion. A second set of processing steps may be associated with a second stream, the access stream, for management of the directory structure in connection with the data portion. Techniques described herein may be characterized as decoupling the foregoing data stream and underlying structures when processing a data portion.

Described in following paragraphs are data structures and techniques in connection with a embodiment using the foregoing decoupled data stream and access structure. An embodiment may use different techniques in connection with each data structure and associated stream.

In one embodiment, the directory structure 106 may be implemented as a B-tree. As known in the art, a B-tree is a balanced binary tree having an order m with the following properties:

1) the root is either a leaf or has at least two children;
2) each node, except for the root and the leaves, has between m/2 and m children;
3) each path from the root to the leaf has a same path length.

An embodiment may also use different types of B-trees, such as a B*-tree in which each interior node is at least ⅔ full. Techniques for management of a B-tree structure, such as for performing inserting, deleting and splitting operations with respect to nodes in the structure, are also well known in the art.

In one embodiment, the B-tree structure may be partitioned into multiple B-tree index structures which will be described in more detail. Each index structure may be associated with a portion of the total possible set of hash range values.

As will be appreciated by those skilled in the art, an embodiment may use the techniques described herein in connection with other data structures besides B-trees as may be used to implement the directory structure.

Figure 11:
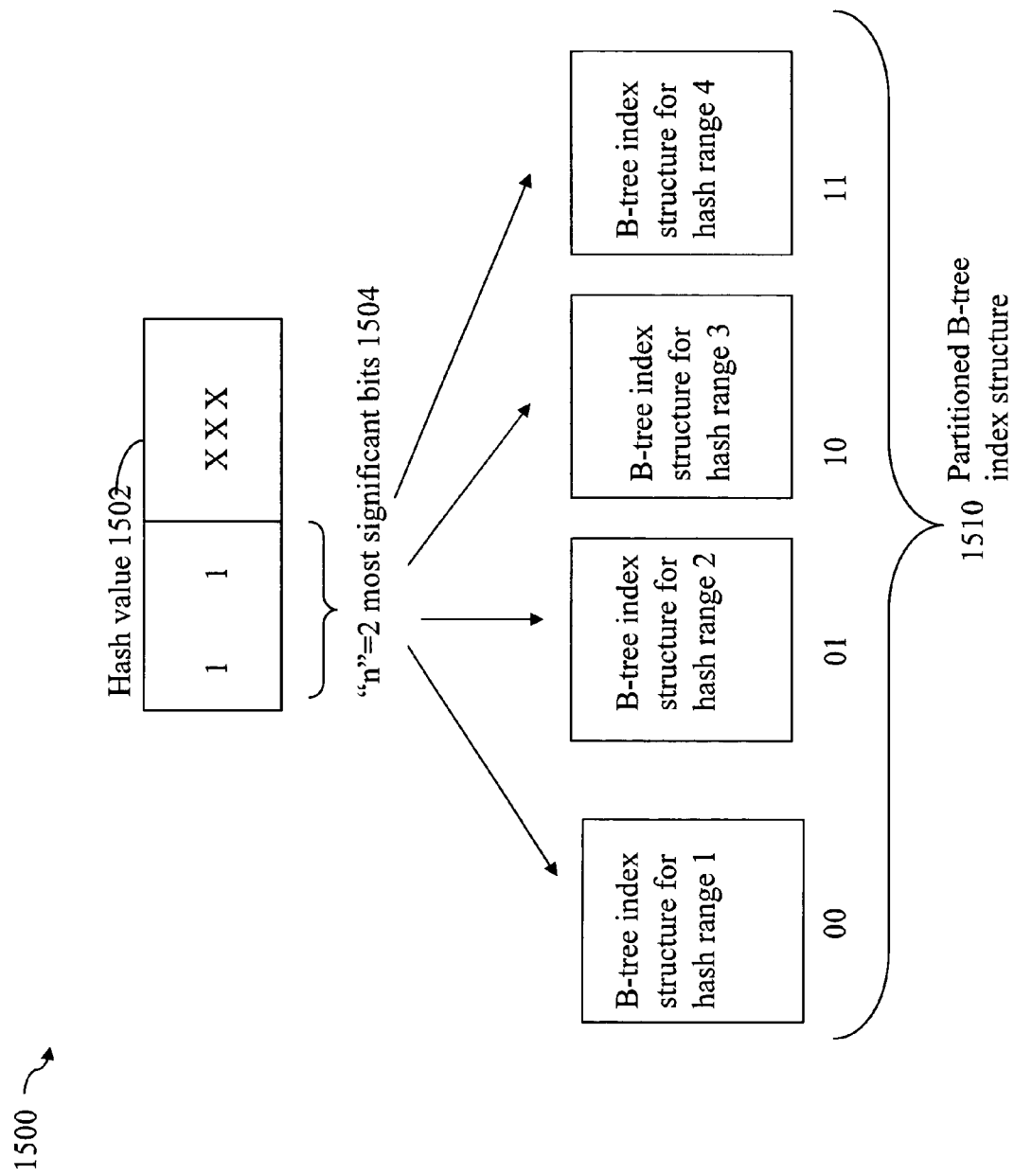
FIG. 11 is an example illustrating the partitioning of a directory structure.

Referring now to FIG. 11, shown is an example 1500 illustrating the partitioning of a directory structure. The example 1500 includes a hash value 1502. The directory structure may be implemented as a partitioned B-tree 1510 having "n" index structures in which "n" represents the "n" most significant bits (MSBs) 1504 of each hash value 1502. In the example 1500, n is illustrated as having a value of 2 so that there are 4 B-tree index structures. Each of the four B-tree index structures holds a B-tree index for a defined range of hash values in which each hash value has MSBs associated with the particular index structure. As such, when the directory structure is accessed, for example, such as when making a determination as to whether a hash value is in the directory, a particular one of the index structures may be accessed depending on the hash value's MSBs.

In connection with the decoupled data stream and access structure stream, for example, when storing a data portion having a hash value, one of the appropriate B-tree index structures may be accessed. When storing the content of the data portion, a tape process stores the content at any location, such as a first available location, on a LUN allocated for exclusive use by the tape process for the duration of the tape process. As such, the tape process does not have to wait for another process that may also be using the LUN. Additionally, no locking or synchronization technique is needed for use in connection with storing the data on the LUN since the LUN is guaranteed to be used only by the tape process.

An example illustrating operations used with the decoupled data stream and access structure approach will now be described.

Figure 12:
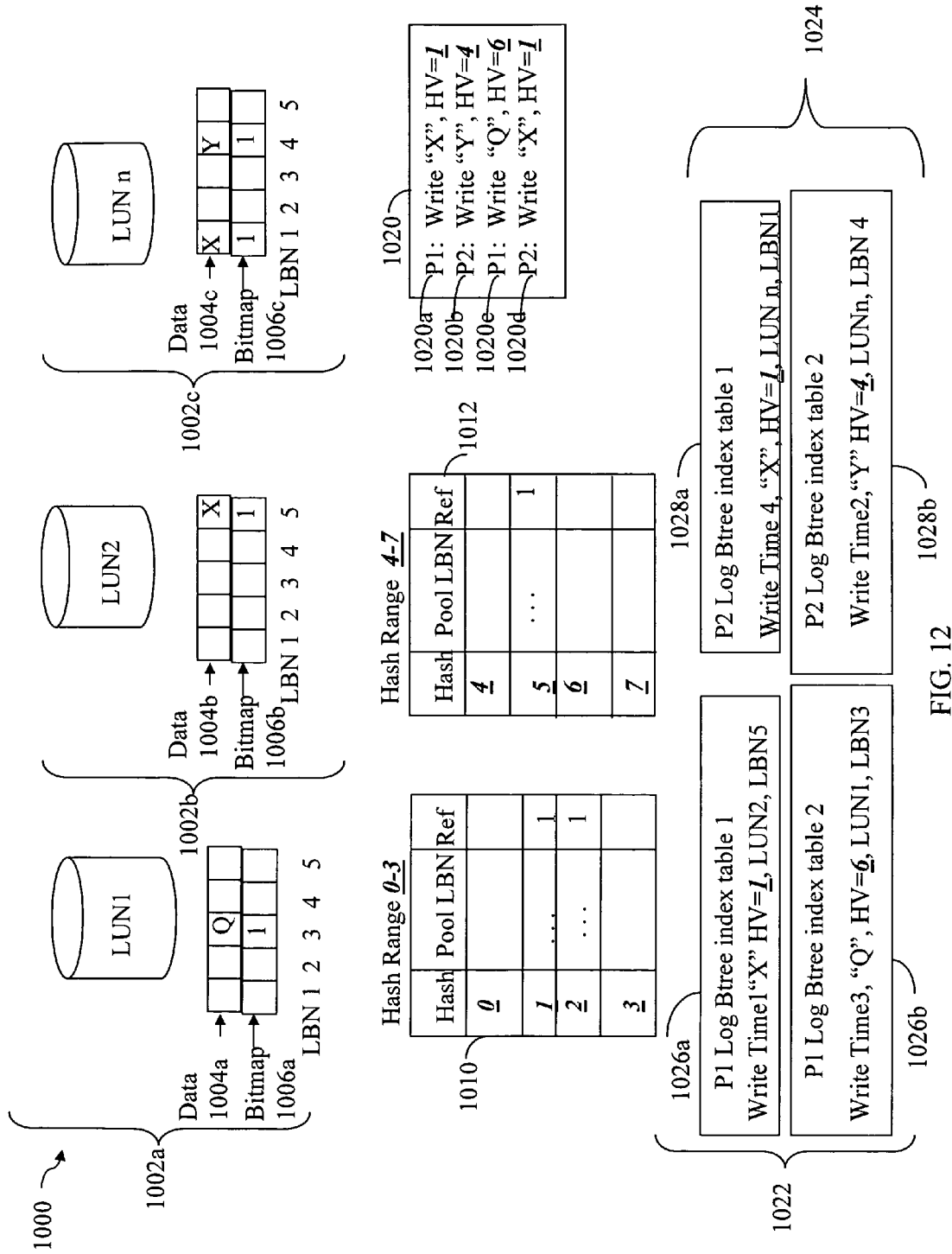
FIGS. 12-16 illustrate the states of various data structures in connection with an example utilizing the techniques described herein.

Referring now to FIG. 12, shown is an example illustrating use of the decoupled data stream and access structure. The example 1000 includes n LUNs and associated structures 1002a-1002n. For example, element 1002a includes LUN1. In connection with this example, the data which will be stored at an LBN of LUN1 is denoted in 1004a. Associated with each LUN is a bitmap, such as 1006a which indicates which LBNs of the associated LUN have data stored thereon. The bitmap 1006a includes a unique bit position associated with each LBN of LUN1. In this example, a 1 in a bit position indicates that the associated LUN has data stored thereon. A value of 0 indicates otherwise. Each of the elements 1002b and 1002c includes a data indication portion and bitmap respectively similar to 1004a and 1006a as described in connection with element 1002a. It should be noted that the bitmaps 1006a-c do not include values of 0 for those available LBNs for purposes of clarity in illustration. An embodiment may store the correct value of 0 or 1 for each entry in the foregoing bitmaps in accordance with those LBNs which are available or unallocated for data storage.

The example 1000 also includes two B-tree index tables 1010 and 1012. In this example the hash range includes values from 0 . . . 7, inclusively. A first portion of the hash range may be associated with the table 1010 and a second portion of the hash range may be associated with the table 1012. In this example, the range of hash values may be represented using 3 bits and the MSB of a hash value may be used in determining which hash table index structure to access. If the hash value is within the inclusive range 0 . . . 3, then the MSB of the hash value is 0 and table 1010 is used. If the hash value is in the inclusive range 4 . . . 7, then the MSB of the hash value is 1 and table 1012 is used.

The example 1000 also illustrates two processes P1 and P2 which are scheduled for execution at the same time in the same batch. Element 1020 includes the write operations or data storage operations performed, for example, in connection with storing portions of a partitioned data segment such as a file. Each process has its own set of one or more log files, one log file for each B-tree index structure table. Generally, if there are c processes executing at a point in time and d index tables, each process has d log files for a total of c*d log files. In this example, there are 2 log files for each process P1 and P2. Element 1022 includes the log files 1026a and 1026b for process P1. Element 1024 includes the log files 1028a and 1028b for process P2.

Processing will be described in the example 1000 for performing the storage operations as indicated by the write operations in 1020 as may be associated with a process P1 and P2 when storing partitioned data portions as described elsewhere herein. Also, in this example, LUNs 1 and 2 have been allocated for exclusive use by process P1 and LUNn has been allocated for exclusive use by process P2. Each data portion is the size of an LBN in this example. The operations in 1020 may be those operations performed by process P1 and P2 which are scheduled as a single batch.

Process P1 is writing a data portion X having a hash value of 1 (e.g., HV=1) as included in 1020. In connection with techniques herein for the directory structures, process P1 does not access one or more of the tables 1010 or 1012. Rather, process P1 logs the write or storage operation for a data portion having a hash value to the appropriate log file of process P1. As such, synchronization of the access to the tables 1010 and 1012 are not required. Rather each process logs the operations it performs to its own local log files.

Process P1 performs processing for 1020a to store the data portion X, HV=1. P1 logs the operation of 1020a in its local or private log file 1026a. P1 also writes out the data portion X to any location on any one of the LUNs allocated for exclusive use by P1. In this example, P1 may store the data portion X on any free location of LUN1 or LUN 2. P1 may randomly select from LUN1 and LUN2 and also select any free location. P1 stores X on LUN2. When storing the value, P1 examines the corresponding bitmap 1006b for LUN2 to determine a free or available LUN. P1 may store the data portion X at a first free or randomly selected LBN of LUN2. In this example, P1 stores X at LBN 5 of LUN 2 and updates the corresponding position in the bitmap 1006b to indicate that LBN 5 contains valid data.

Process P2 performs 1020b to store the data portion Y, HV=4 and logs the operation to the log file 1028b as the first entry. P2 selects a location on its allocated LUN, LUNn, at which to store the contents of data portion Y. P2 stores Y at LBN 4 of LUNn and updates the bitmap 1006c. Process P1 performs 1020c to store the data portion Q, HV=6 and logs the operation to the log file 1026b. P1 selects LUN1, LBN3 as the location to store the content Q and updates bitmap 1006a. P2 performs 1020d to store the data portion X, HV=1 and logs the operation to log file 1028b. P2 selects LUNn, LBN1 as the location to store the content X.

Each of LUN1, LUN2 and LUNn belong to the storage pool at which data portions or contents may be stored. Each process performs what may be characterized as speculative writes of each data portion to be stored in operations 1020a-1020d. The data stored at each location in the storage pool as illustrated in 1000 may not remain as the storage pool location used for the single instance storage location as will be apparent in subsequent illustrations.

Once the processes P1 and P2 of the currently scheduled batch have completed the store or write operations as included in 1020, processing may be performed to merge the various log files. In one embodiment, all log files associated with each index table structure may be merged and then sorted. In other words, log files 1026*a* and 1028*a* are merged into a single log file and log files 1026*b* and 1028*b* are merged into a single log file.

Figure 13:
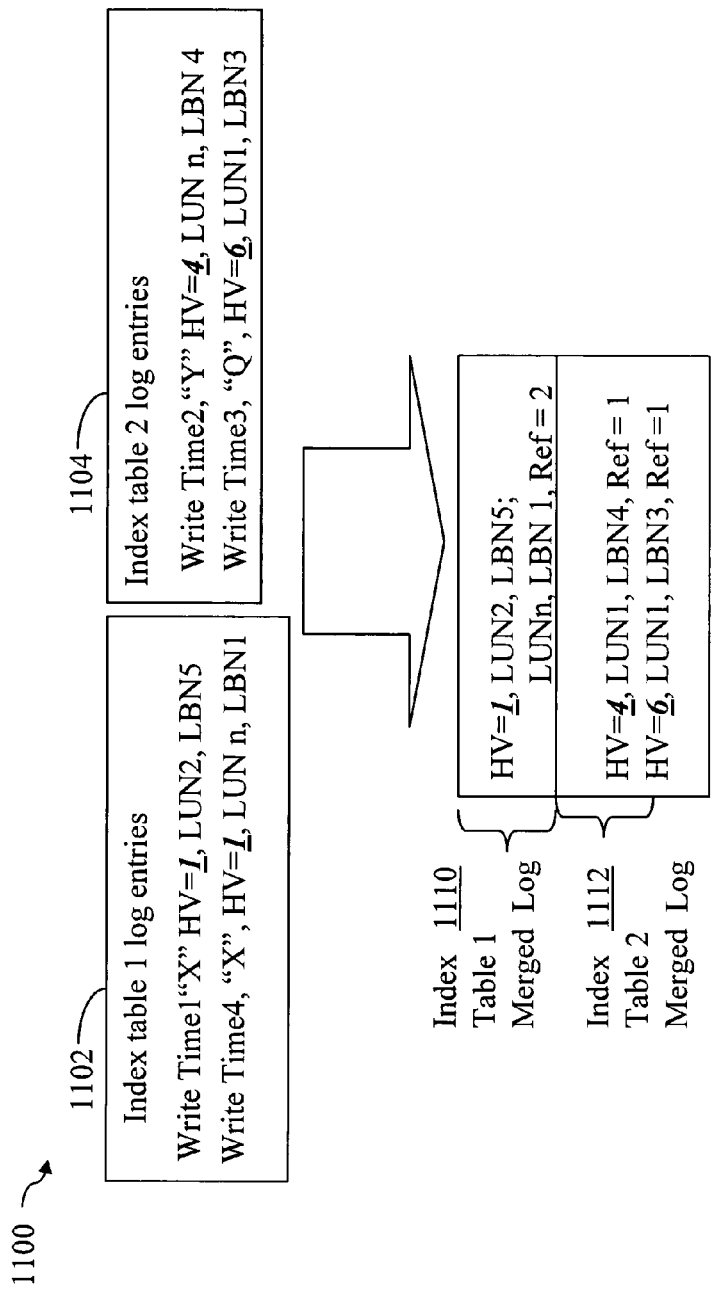

Referring now to FIG. 13, shown is an example illustrating the merged log files. In the example 1100, 1102 represents the merged log file entries for index table 1010, and 1104 represents the merged log file entries for index table 1012. Each of 1102 and 1104 are sorted by hash value (HV). Entries from the log file referencing the same data portion or content and thus having the same hash value are identified and may be combined as part of the log file merging process. In this example, there are two entries in 1102 for X, HV=1. These two entries may be combined into a single entry as indicated in 1110 having a reference count indicating the number of duplicative log entries. Element 1112 represents the log file for index table 2 1012 having any duplicative log entries combined into a single entry with a reference count >1. In this example, the merged log 1104 and 1112 include the same entries since there are no such duplicate entries for a same hash value. Each of the merged log files 1110 and 1112 are sorted by hash value (HV).

After the log files are merged, processing may be performed to update the various B-tree index tables 1010 and 1012. For purposes of illustration and example, both B-tree index tables 1010 and 1012 will be updated at a same time although in an embodiment, the scheduler may schedule one or more B-tree index structures to be updated at a same time as part of a same batch. In other words, the scheduler may schedule the updating of each B-tree index table 1010 and 1012 independently of each other. Such scheduling may be determined in accordance with the resources of each system.

In one embodiment, the B-tree index tables may be stored on persistent storage. At the end of the processing, the copy of the B-tree index tables as maintained on the persistent storage is updated in accordance with the merged log entries of 1110 and 1112.

Figure 14:
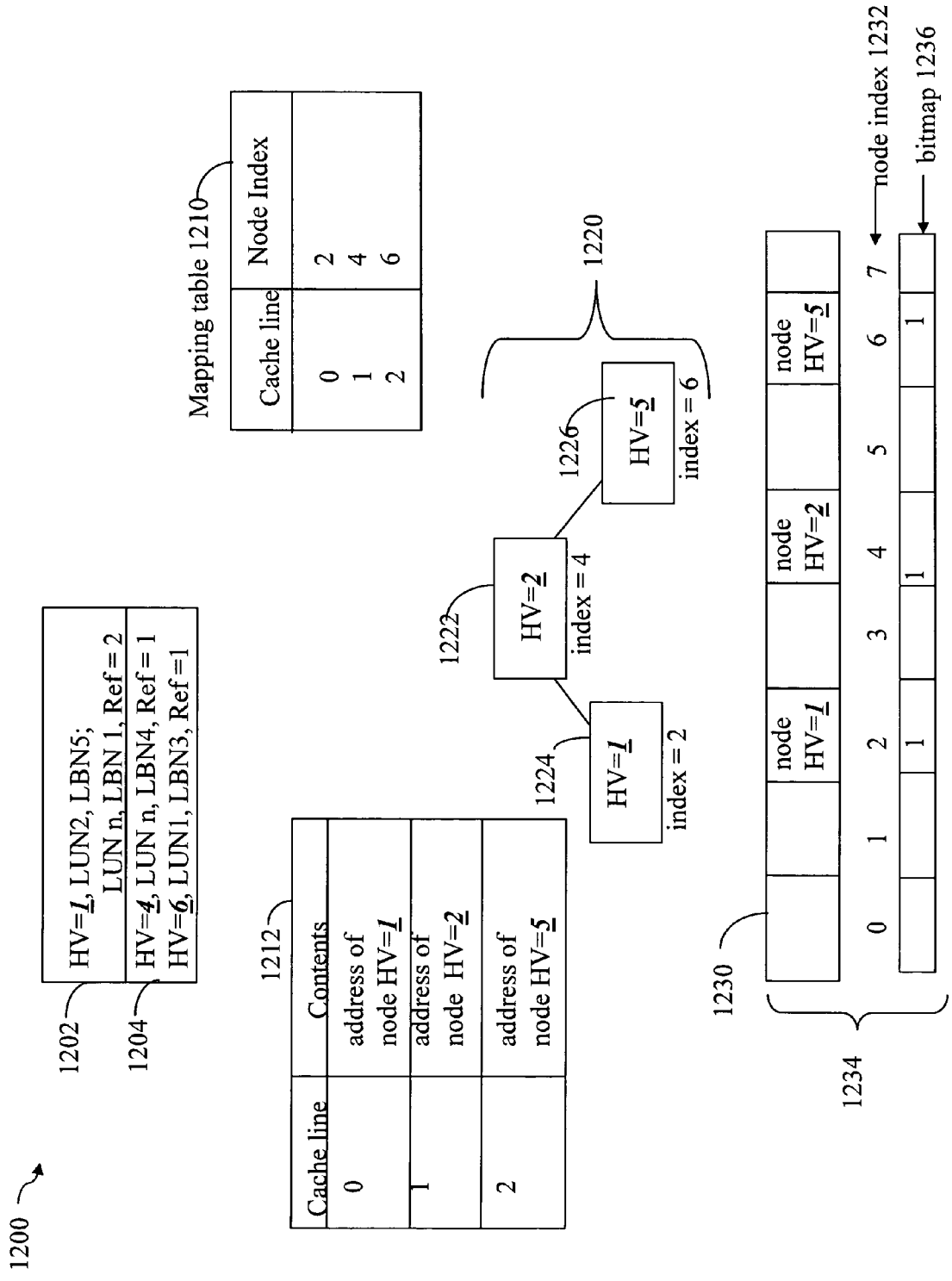

Referring now to FIG. 14, shown is an example illustrating updating of the B-tree index structures as maintained on persistent storage. The example 1200 includes the merged log files 1202 and 1204. In this example, both index structures are able to be stored in cache at a same time so updating may be performed accordingly for both index tables 1010 and 1012. In an embodiment in which there may be an insufficient amount of cache to hold all index tables, each index table may be updated independently. The example 1200 includes a cache 1212, a mapping table 1210, a logical representation of the B-tree index structure 1220, and a physical representation of the B-tree index structure 1234.

Element 1220 includes a logical representation of the B-tree index structures prior to merging the log files 1202 and 1204. Element 1220 includes 3 nodes for 3 data portions. In each node 1222, 1224 and 1226, the hash value N of the node is denoted "HV=N". Each node may have a left child and a right child. Beneath each node is an index number m denoted "index=m". The index number represents the index number associated with the corresponding node. In this example, each node of the B-tree index structure is allocated one LBN. As such, each node of the index structure may be stored at an LBN denoted by its index number. It should be noted that an embodiment may use a different mapping of index node to LBN indicating a physical location on the persistent storage location at which each node is stored. Element 1230 represents a physical layout block by block (e.g., per LBN) of how nodes of the index structure of 1220 appear on persistent storage. Element 1230 may be a buffer of storage into which the index structure node data from the persistent storage is read. Element 1232 denotes the node index or LBN in this case of each node's data as stored in 1230. Element 1236 is a bitmap structure indicating which portions of the buffer 1230 include valid node data. The bitmap structure 1236 includes an entry for each node or LBN in 1230. An entry of 1 in 1236 indicates that the corresponding LBN is used to contain valid node data A value of 0 in 1236 indicates that the corresponding LBN or node index is associated with a node that is available. It should be noted that the bitmap 1236 does not include values of 0 for those available nodes for purposes of clarity in illustration. An embodiment may store the correct value of 0 or 1 for each entry in the bitmap 1236. The node index indicates a physical location or offset in the persistent storage.

After the merged log files are created, the current B-tree index structure is read in from persistent storage. The logical representation of the B-tree prior to the merge is illustrated by 1220. A representation of how the B-tree is stored in physical storage prior to the merge is represented by 1234. Buffer space is allocated as represented by 1230 and the B-tree index contents are read from the persistent storage device. As the data is read in from the device, the bitmap structure 1236 also stored thereon is read in. It should be noted that an embodiment may alternatively generate 1236 each time when reading the data of 1230 from the persistent storage.

After the data is read into the buffer 1230, the B-tree index structure data is read from the buffer to store information in cache and build the mapping table 1210. The buffer 1230 is traversed sequentially in accordance with the bitmap 1236. Only those locations of 1230 including node data (e.g., as indicated by 1 in entries of 1236) are traversed. The first entry in the buffer 1230 containing node data is located at LBN 2 for index node 2. The data stored at index node 2 corresponds to the data portion having an HV=1. The address of the location of node index 2 in the buffer is stored in cache line 0. In the mapping table, information is recorded to note the node index whose address is stored in cache line 0. In other words, the cache 1212 includes a pointer or address of each node in the buffer for an allocated B-tree node. The mapping table 1210 denotes which node's address (e.g., node as identified by the node index number) is stored at each cache line. Similarly, processing is performed to read index node 4 (HV=2) into cache line 1, index node 6 (HV=5) into cache line 2, and create entries in the mapping table 1210 for each cache line as the data is read into cache.

Once the current B-tree index structure is processed causing the cache to be initialized and the mapping table 1210 created, processing of the merged log files may be performed.

Figure 15:
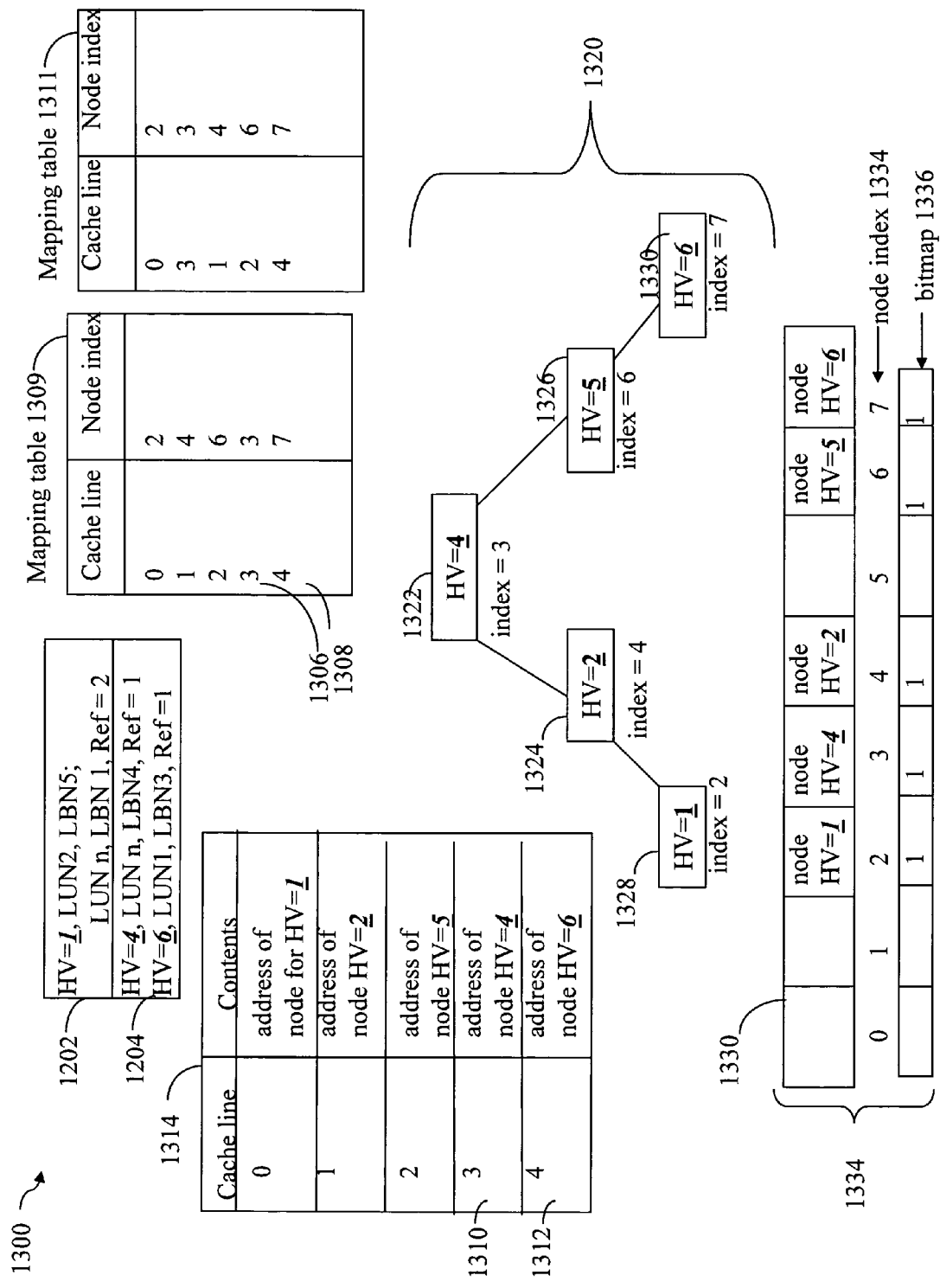

Referring now to FIG. 15, shown is an example illustrating the updating of the index structure in accordance with the merged logs. The example 1300 includes components similar to as described in connection with the example 1200. The example 1300 shows the data structures updated in accordance with the merged logs 1202 and 1204. Steps associated with this updating process will now be described.

With reference to the example 1300, the log entry in 1202 is processed. An inquiry is made as to whether address of the B-tree node corresponding to the HV=1 is in cache. In one embodiment, this may be determined by traversing the B-tree. In one embodiment, a pointer to the root index node may be maintained as a variable of state information. Using this pointer to the root index node, the nodes in the B-tree as stored in the buffer may be traversed to determine if there exists a node in the tree for HV=1. To further illustrate, the root node pointer points to the location in the buffer for node index 4.

The corresponding hash value of 2 is examined. Since HV=2 is the key value by which nodes in the tree are logically arranged, nodes having an HV<2 are stored in the left subtree of the root node and nodes having an HV>2 are stored in the right subtree of the root node. Similarly, at any level of the B-tree, any nodes having values less than a first node's key are stored in the left subtree of the first node, and any nodes having values greater than the first node's key are stored in the right subtree of the first node. In this example, the node 1222 includes a pointer or address of the left child node having an index of 2 for HV=1. The B-tree traversal results in a determination that there is a node in the B-tree index structure for the log entry of 1202, HV=1. As such, there is a corresponding cache entry for index node 2 and the data portion corresponding to the HV=1 is already somewhere in the storage pool. The copy of the data "X" having the HV=1 which is stored at LUN2, LBN5 may be deemed a speculative write. In connection with SIS techniques, only one unique copy of the data portion "X" is stored and the copies made in connection with the log entry 1202 (e.g., storage operations 1020a and 1020d) may be invalidated or zeroed out for reuse. In one embodiment, the storage location associated with the oldest or first stored copy may be retained and subsequently stored versions may have their corresponding storage locations made available for reuse. The data bitmap location of LUN2, LBN5 and LUN N, LBN 1 may be updated to zero so that the corresponding storage location may be reused for storing other data. The data portion having an HV=1 has been stored in the storage pool at another location prior to performing the operations in 1020. In connection with the processing of the entry in 1202, the reference count of the B-tree index node corresponding to HV=1 is incremented by 2 in accordance with the reference count from the log entry of 1202. The index node for HV=1 as included in the buffer is updated using the node located from the previous B-tree traversal.

Processing continues with log entries from 1204. For the log entry having an HV=4, it is determined that there is no corresponding node in the tree and thus does not have an address thereof in the cache. As a result, a B-tree node may be allocated and initialized, and new corresponding entries in the cache 1212 and mapping table 1210 may be allocated and initialized.

In one embodiment, allocation of the B-tree node may be made in accordance with the HV of the node. The node is allocated storage at an address in the buffer corresponding to the node's HV. The mapping of the physical location of the node is first determined to be the index number of the node's HV. In this example, the HV=4 initially maps to the fourth LBN of the buffer which is already occupied or allocated for use with another B tree node. In other words, there is a hash collision when mapping the HV to a node index number or LBN, and processing is then performed to resolve this collision. In the embodiment described herein, processing is then performed to look for another available location, such as the next free node location or LBN+/−1 LBN from the current LBN of 4 (e.g., either position 5 or 3). It is determined that LBN 3 is available and it is allocated for use in connection with the node for HV=4. The bitmap 1336 may be updated to indicate the allocation of node index 3 at LBN 3.

In connection with techniques described herein, B-tree nodes of the index structure may be allocated to have a first address in accordance with each node's hash value. A collision in this mapping occurs if such a position is already occupied. As a resolution, a search may be performed to determine the first currently available location which is physically closest to the first address. As such, the positional allocation of storage for each node is in accordance with each node's hash value. Advantages of such positional allocation are described in more detail elsewhere herein and may be used to facilitate storing the B-tree index structure to the persistent storage and when reading information from the persistent storage into cache.

As will be appreciated by those skilled in the art, other operations are performed at subsequent processing points in connection with maintaining the B-tree structure such as, for example, inserting and/or deleting nodes to maintain balance of the structure. As such operations are performed, the data structures described herein, such as the B-tree index node bitmap, and others may accordingly be updated.

In connection with the first entry 1204 HV=4, processing is performed to allocate a cache line 1310 and store the address of the newly allocated node having the index=3. The newly allocated B-tree index node=3 in the buffer 1330 at location LBN3 is updated to include: the storage pool location of LUN n, LBN 4 for the data corresponding to HV=4 and a reference count of 1 as indicated in the log entry. The mapping table is updated to include an additional entry 1306 in accordance with the newly allocated cache line 1310.

Processing is performed in connection with the remaining log entry for HV=6 in a manner similar to that as described above in connection with HV=4. It is determined that there is no existing B tree node for HV=6 so cache line 1312 is allocated and initialized, and a corresponding entry is allocated for a new B-tree index node which is at location LBN 7 in the buffer. The node index=7 is initialized and the bitmap 1336 is updated to indicate that LBN 7 is allocated. It should be noted that in connection with the log entry for HV=6, the techniques described herein initially determine that the location in the buffer 1330 associated with the index node of 6 (equal to the HV) should be the address of the newly allocated node. However, as determined using the bitmap 1336, the node at index location 6 (e.g., LBN=6) is already allocated. As such, processing is performed to resolve the collision and determines that the node at index location 7 (e.g., original address+1 LBN) is available and accordingly allocates the new node at the index location=7 (e.g., LBN=7).

Once the merged logs have been processed, the contents of the buffer 1334 may then be written out to the persistent storage as part of a commit phase processing. The mapping table 1309 may be used in connection with this process. The structure 1309 is sorted by node index or LBN as represented in 1311. The table 1311 may be traversed in increasing node index order. For each node index, the corresponding cache line is obtained from 1309. Using the cache line number from 1311, the address of the corresponding node (e.g., buffer address) is obtained from cache 1314, and the node contents are read from the buffer location. The node contents are then written out to an appropriate location on the persistent storage device containing the persistent storage copy of the B tree index nodes.

Figure 16:
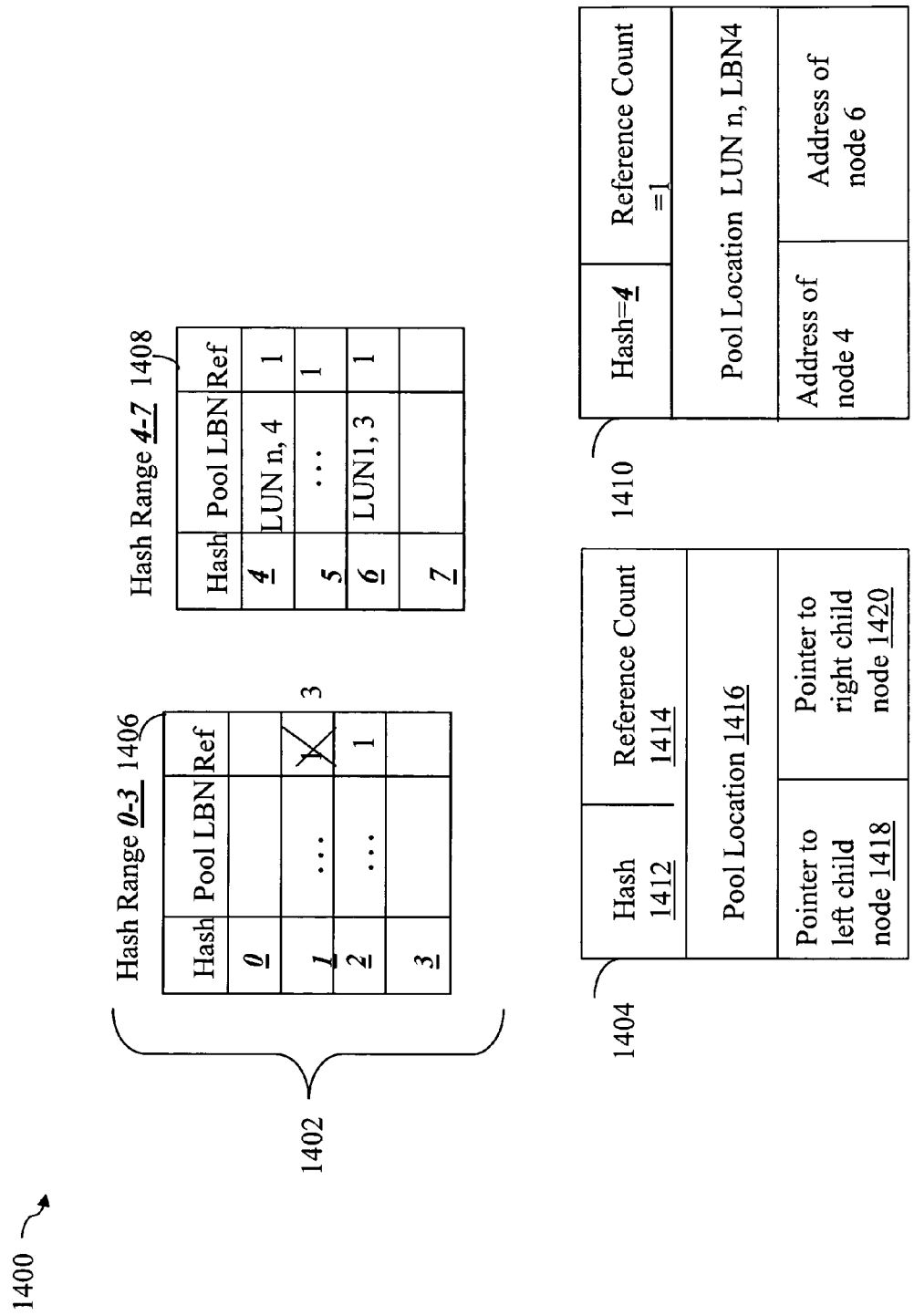

Referring now to FIG. 16, shown is a representation of the updated B-tree index structures and a more detailed representation of a node in the index structure. The element 1402 illustrates a logical representation of the contents of the B-tree index structures after the updating processing just described in connection with the merged log files 1202 and 1204. The information in 1402 reflects the representation 1320 of FIG. 15 and is in accordance with the physical representation of 1334. Element 1404 is one example representation of a B-tree node as may be included in an embodiment and used in connection with the techniques described herein. The element 1404 includes fields for a hash value 1412, a reference count 1414, a storage pool location 1416, a pointer to the left child node 1418 and a pointer to the right child node

1420. Element 1410 illustrates values as may be included in node having fields of 1404 when the node has the HV=4 as described in connection with the foregoing example of FIGS. 12-15.

In connection with the techniques herein, the amount of storage in the storage pool, such as the number of LUNs used in connection with scheduling tape processes, may be scaled out to whatever storage is needed in an embodiment. Each process executing in a batch uses its own state information including its private log files and the bitmap of one or more LUNs exclusively allocated for use by a process. As such, there is no contention between resources for processes when writing a data portion to the storage pool. Additionally, there is no contention when a process is writing to its own private log files. Once all processes in a batch have completed, log files may be merged and the index structures updated.

Figure 17:
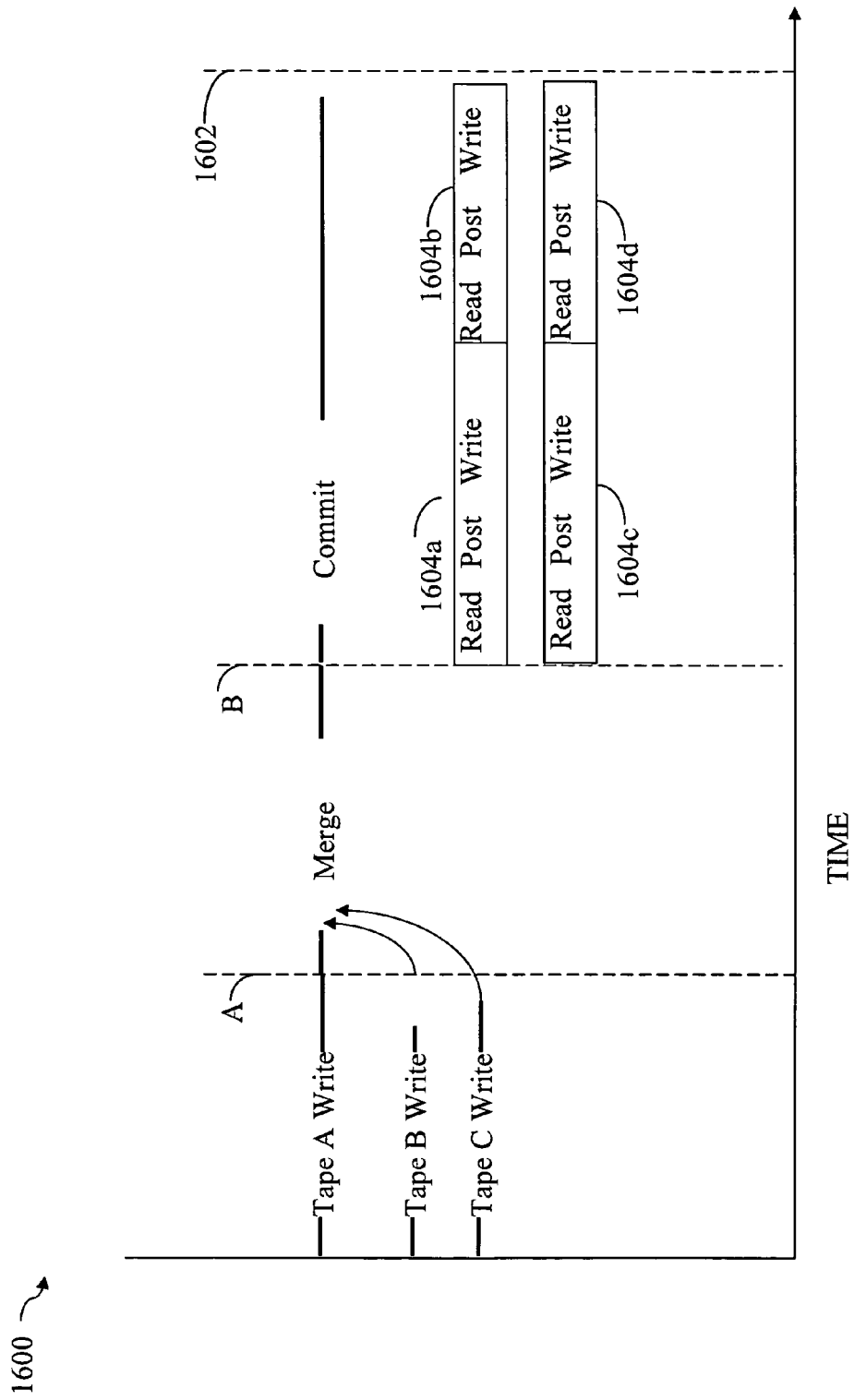
FIG. 17 is another graphical illustration of scheduled processing in accordance with the techniques described herein.

Referring now to FIG. 17, shown is a graphical illustration of scheduled tasks as may be determined by the scheduler. It should be noted that the example 1600 presents a more detailed schedule than as illustrated in FIG. 10. In the example 1600, additional detail regarding processing associated with each is illustrated as including a write phase, a merge phase and a commit phase. The scheduler in an embodiment may schedule a batch of tape processes for writing out the tapes A, B and C as illustrated. At a later point in time A, the log files of each tape process in the batch are merged as part of the merge phase processing. At time B, processing may be performed to write out or commit the merged log files to the persistently stored copy of the B-tree index structures. The commit phase may include reading the copy of the B-tree index structure from the persistent storage into a buffer or memory location, posting the entries of the merged log files to update the B-tree index copy in the buffer, and then writing the updated buffer contents back out to the persistent storage.

In one embodiment, it should be noted that processing associated with scheduling is performed at the batch level of granularity. Either all tapes associated with a batch have their associated content stored, or none of the content of the tapes of the batch are stored. Accordingly, the commit phase is either successfully performed for all tapes in the batch or none of the tapes in the batch.

What will now be described are flowcharts illustrating the processing just described.

Figure 18:
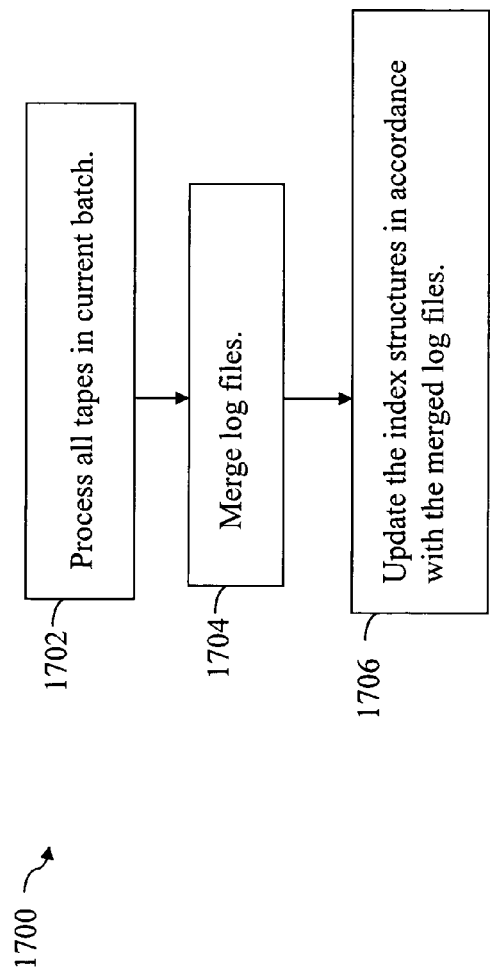
FIGS. 18, 19A, 19B, 20, 21 and 22 are flowcharts summarizing processing that may be performed in connection with using the decoupled access structure and data stream structure as described herein.

Referring now to FIG. 18, shown is a flowchart of processing steps that may be performed in an embodiment in connection with processing a batch of tape processes. At step 1702, all tapes in the current batch are processed such as, for example, by writing out the data portions to the storage pool and accordingly logging all such writes in accordance with techniques described herein. At step 1704, one or more log files for each of the various index structures may be merged. As described herein, each of the processes may have a set of one or more private log files, one private log file for each index structure. As described herein, the pool directory may be implemented using an index structure such as B-tree which may be partitioned into multiple index structures. Each of the partitioned index structures may be associated with a defined range of hash values. At step 1706, the index structures are updated in accordance with the merged log files.

Figure 19A:
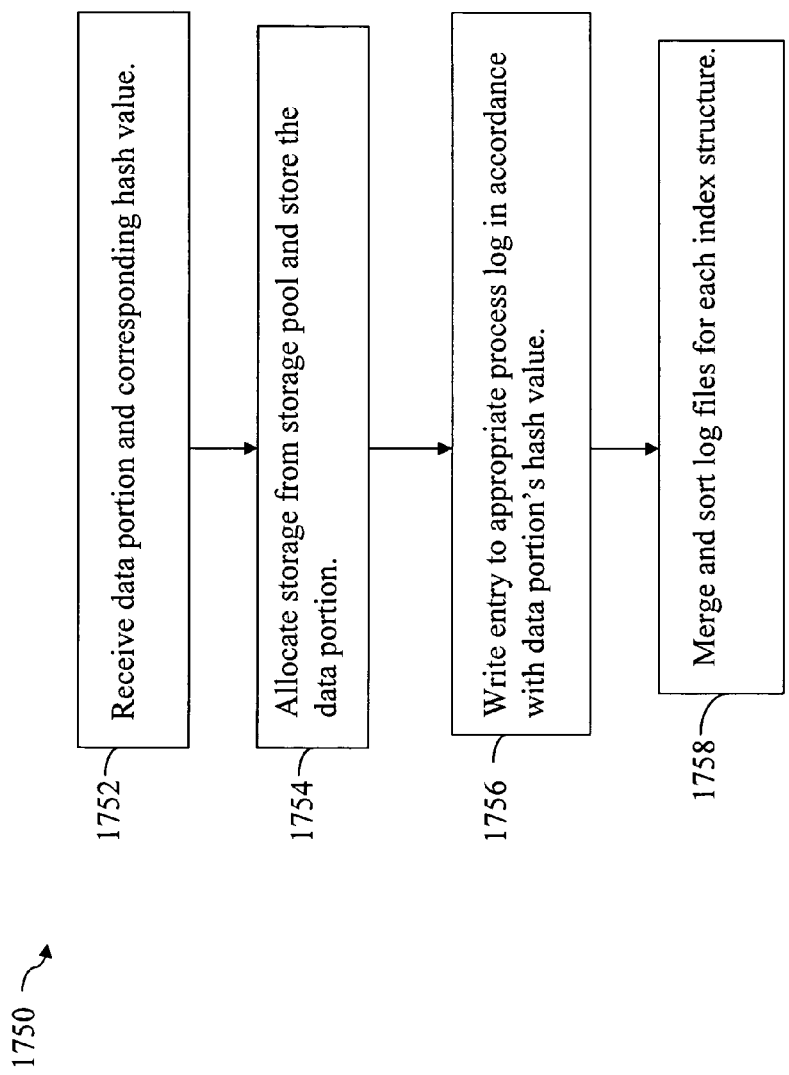

Referring now to FIG. 19A, shown is a flowchart of processing steps that may be performed in an embodiment in connection with storing a data portion. As described elsewhere herein, a received data segment may be partitioned into one or more data portion. The processing of flowchart 1750 may be performed for each such data portion. At step 1752, the data portion is received along with its corresponding hash value. At step 1754, storage for the data portion is allocated from the storage pool in the data portion is stored therein. As described above, storage is allocated from the one or more LUNs used exclusively by the executing process. At step 1756, an entry is written to the appropriate process log in accordance with the data portion's hash value. Step 1756 processing is performed with respect to one of the private logs associated with each executing process. The log selected and written to in connection with the step 1756 processing is determined in accordance with the data portion's hash value. At step 1758, processing is performed to merge all of the private logs from each process for each of the index structures. Step 1758 processing includes removing or merging duplicate log entries having a same hash value, and also sorting the merged log files in accordance with hash values.

Figure 19B:
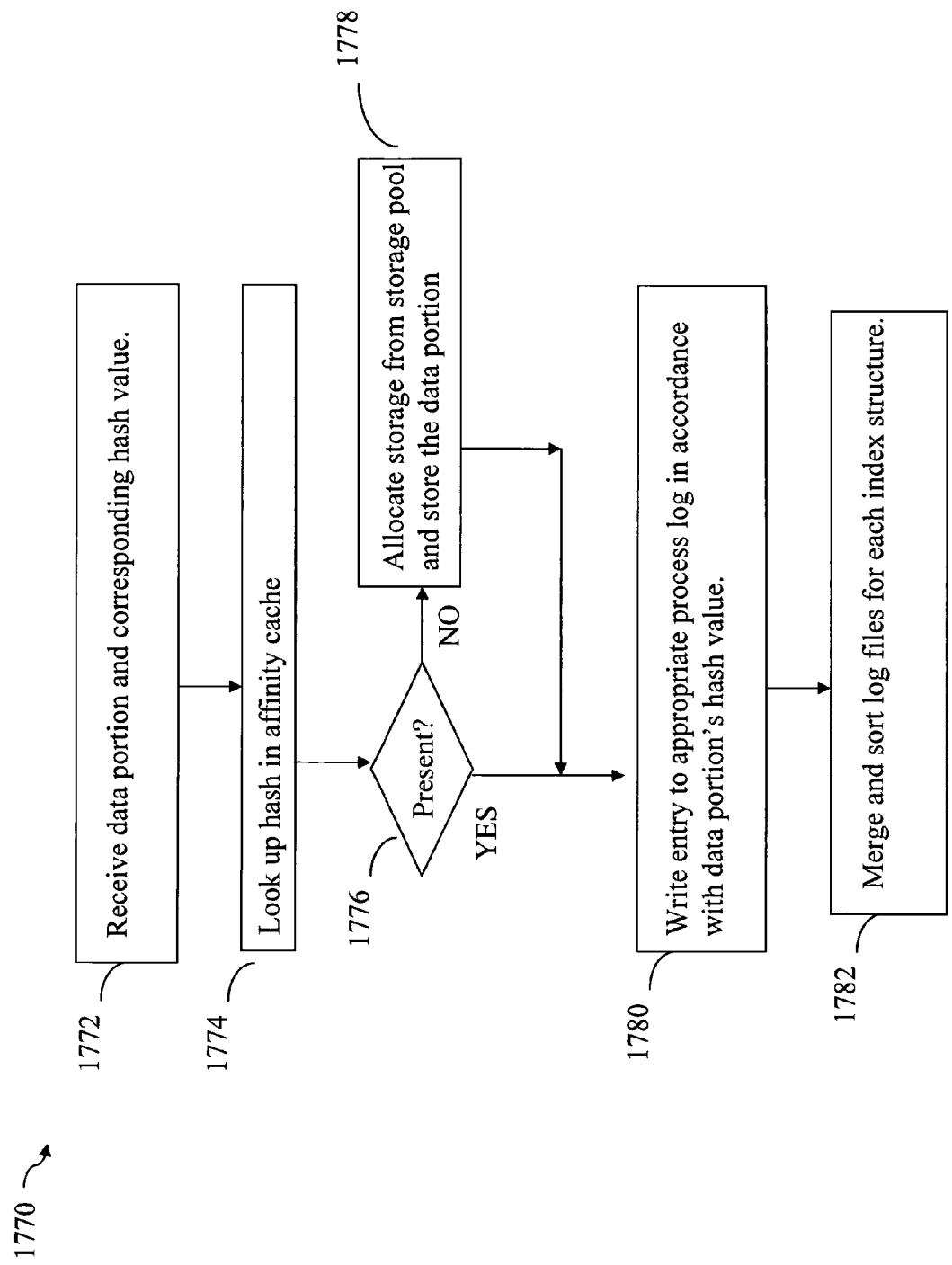

Referring now to FIG. 19B, shown is a flowchart including processing steps that may be performed in an embodiment as an alternative to the processing steps of FIG. 19A. The steps of the flowchart 1170 may be performed in an embodiment utilizing the affinity caching technique as described elsewhere herein. As set forth in more detail in following paragraphs, the affinity caching techniques may be used to reduce processing by initializing the cache with hash indices of related previously stored data sets. When processing a current data set in which the cache has been initialized to include the forgoing hash values, if the cache includes an entry for a hash value of the current data set, it means that there is already a copy of the data portion or contents stored in the data storage pool and processing may be performed as in flowchart 1770. Steps 1752, 1756, and 1758 of flowchart 1750 are similar, respectively, to steps 1772, 1780 and 1782 of flowchart 1770. After determining the hash value at step 172, the cache is queried to determine if the hash value is in the cache initialized in accordance with the affinity caching techniques described herein. If the hash value is in the cache, step 1776 evaluates to no, control proceeds to step 1778 to allocate storage form the storage pool and store the data portion. Control proceeds to step 1756 where an entry is written to the appropriate process log. If step 1760 evaluates to yes, control proceeds directly to step 1780 where an entry is also written to the appropriate process log. It should be noted that the entry written at step 1756 may include different information depending on whether storage was allocated in connection with step 1778 processing. The processing steps of flowchart 1770 as may be performed in an embodiment utilizing affinity caching are described in more detail, for example, in connection with FIG. 27.

Figure 20:
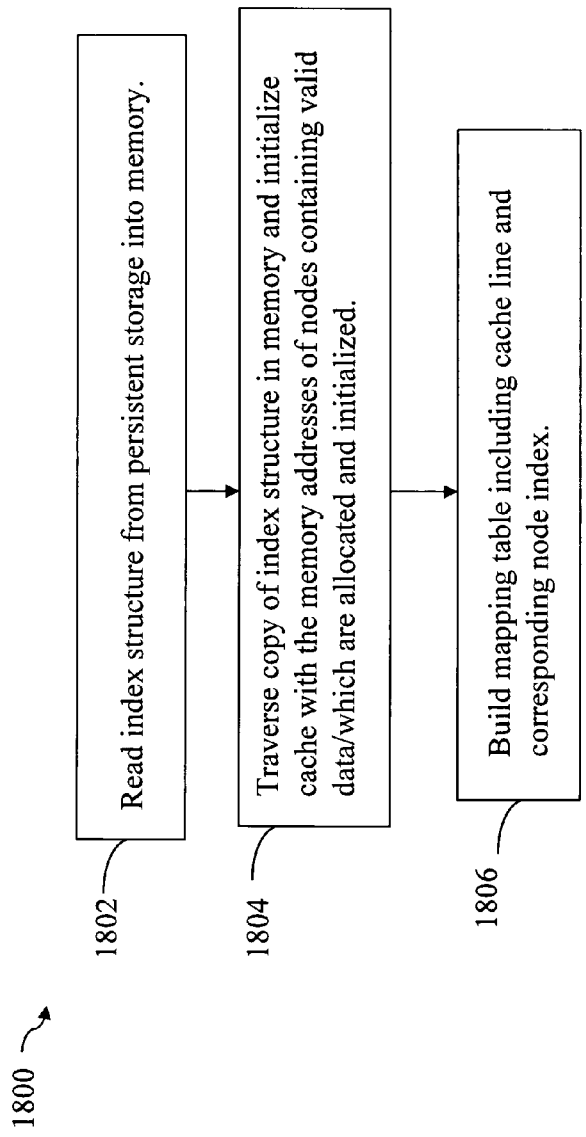

Referring now to FIG. 20, shown is a flowchart of processing steps that may be performed in an embodiment in connection with updating the directory structure as stored on persistent storage. The processing steps of flowchart 1800 may be characterized as a first set of processing steps performed in connection with commit processing to commit the merged logs to the persistent storage copy of the directory structure. Processing steps of FIGS. 21 and 22 may also be performed in an embodiment as part of the processing associated with updating a persistent copy of the index or access structure.

At step 1802, the index structure is read from persistent storage into memory. At step 1804, a copy of the index structure as stored in memory is traversed and the cache is initialized with the memory addresses of nodes containing valid data (e.g., allocated and initialized nodes). At step 1806, the mapping table is generated while traversing the copy of the index structure and memory. As described above, the mapping table includes a record of each cache line and corresponding node index.

It should be noted that the processing steps of flowchart 1808 be performed with respect to one or more index structures which may be processed at a time.

Figure 21:
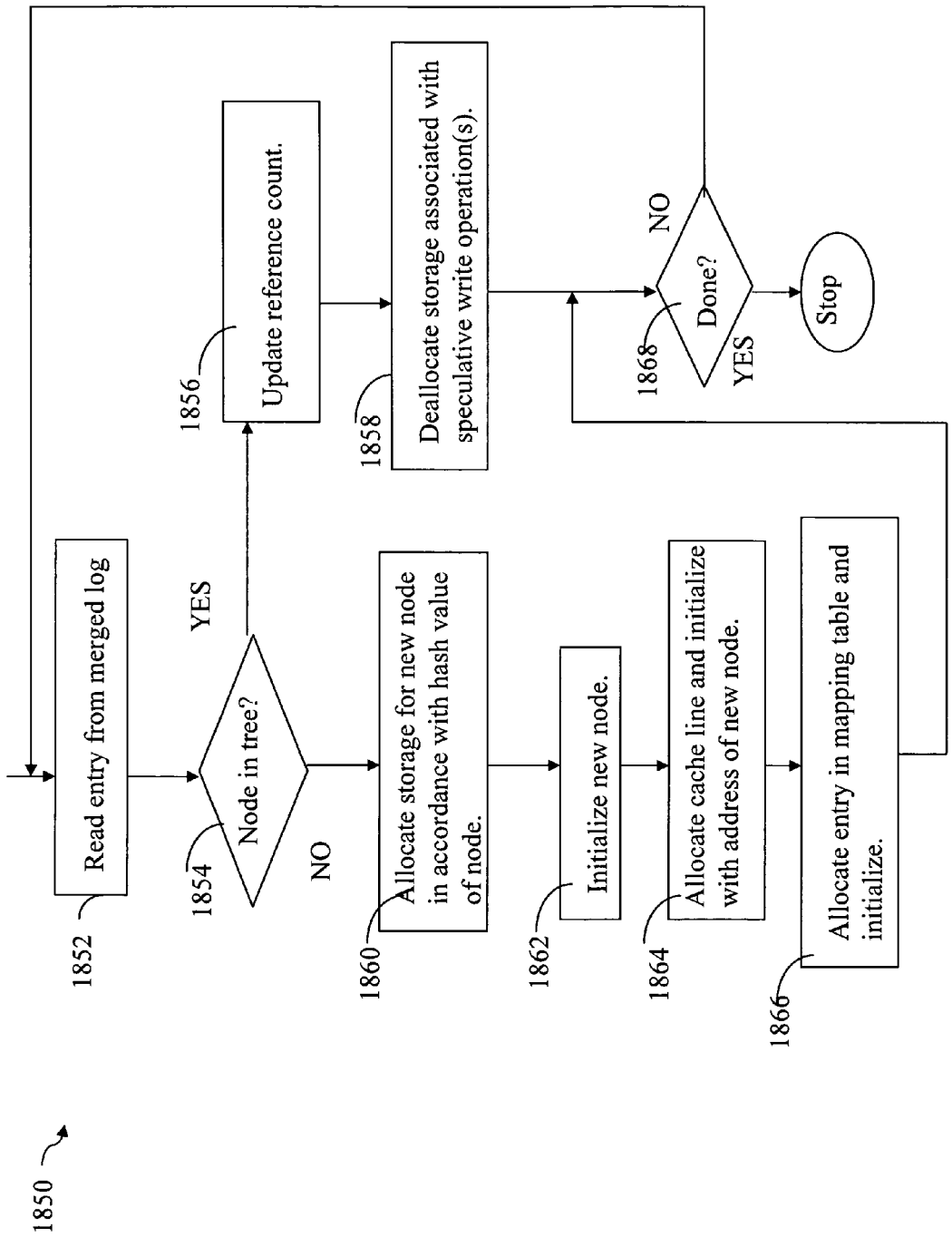

Referring now to FIG. 21, shown is a flowchart of processing steps that may be performed in connection with processing entries from a merged log file for one of the index structures. The processing of flowchart 1850 may be performed for each of the merged log files associated with each of the index structures. At step 1852, an entry is read from the merged log file. At step 1854, a determination is made as to whether there is node in the existing index structure having a hash value corresponding to the entry read at step 1852 from the merged log file. If step 1854 evaluates to yes, control proceeds to step 1856 to update the reference count of the existing node in the index structure. At step 1858, the storage associated with the speculative write operation(s) of the current merged log entry is deallocated. As described herein, this deallocation may be performed by updating the bitmap structure associated with each LUN in the storage pool. Control proceeds to step 1868 where a determination is made as to whether all entries in the merged log file have been processed. If not, control proceeds to step 1852. If step 1868 evaluates to yes, processing stops.

If a step 1854 evaluates to no, control proceeds to step 1860, where storage for a new node in the index structure is allocated in accordance with the hash value of the node. At step 1862, the new node is initialized. Step 1862 processing may include initializing the structure 1404 of FIG. 16. At step 1864, storage is allocated from the cache and initialized at the address of the newly allocated known from step 1860. At step 1866, and entry is allocated in the mapping table and initialized in accordance with the newly allocated cache line. From step 1866 control proceeds to step 1868.

Figure 22:
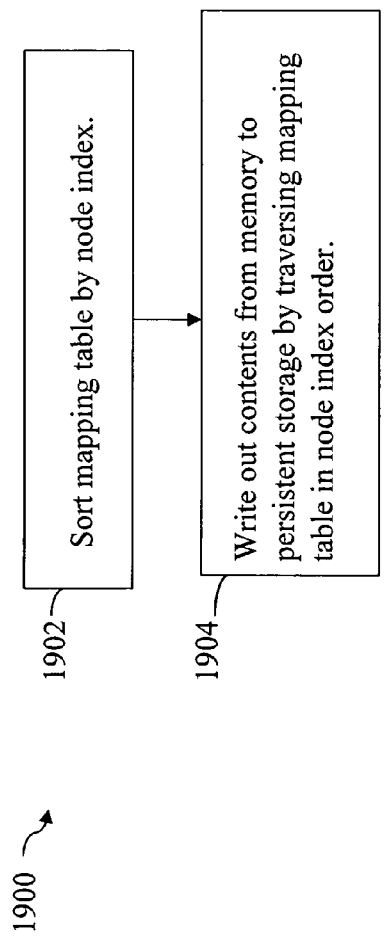

Referring now to FIG. 22, shown is a flowchart of processing steps that may be performed in connection with writing out the updated B-tree index structure or pool directory to the persistent storage. At step 1902, the mapping table is sorted by node index. At step 1904, the contents of the index structure stored in memory is written to persistent storage by traversing the mapping table in node index order.

In connection with the data stream and access structures herein, data portions are written to a location in the storage pool and the index stream is logged using private logs files of each tape process. At a later point, all the log files associated with each partition of the index structure are merged to be used in connection with updating the B-tree index structure or pool directory as stored on persistent storage. The foregoing may be performed in an embodiment in which there are multiple tape processes executing in parallel. Each process writes out its data portions independently of the other processes. The number of available LUNs in the storage pool is used in determining an upper bound on the number of processes that may execute in parallel since each process is allocated at least one LUN for exclusive access while processing a designated tape.

In connection with the techniques described herein, the nodes of the pool directory, such as the B-tree indexing structure, may be allocated so that the address of each node is determined in accordance with a hash value of the node. As such, the physical location of each node as stored in the persistent storage is in accordance with the ordering of hash values. In other words, each node is positionally allocated based on the hash value of the node. In the embodiment described herein, each node is allocated on a single LBN boundary so that the hash value of a node results in an initial determination that the node should be allocated at an LBN equal to the node's hash value. It should be noted that the LBN of the node in the foregoing initial determination may represent an LBN offset relative to the starting address of the first such node. An embodiment utilizing the positional allocation techniques as illustrated herein may realize performance advantages when reading and/or writing the index structure data from the persistent storage in connection with updates, as well as performing other operations in connection with maintaining a B-tree index structure as known in the art.

In one embodiment, the amount of persistent storage allocated for the B-tree index may be determined in accordance with the maximum number of nodes possible in the B-tree index structures. The maximum number of nodes may be a parameter set as a design choice. The amount of persistent storage allocated for the B-tree index represents the size of the space from which the nodes of the B-tree index are mapped and allocated. In one embodiment, the size of the allocation space from which the B-tree index nodes are allocated should be approximately in the range of 10%-20% more than the storage associated with the maximum number of nodes in the B-tree index structure. For example, as a design choice, an embodiment may indicate that the B-tree index structure may include a maximum number of 20 nodes. The size of the allocation space from which the B-tree index nodes are allocated may be the size of 22-24 nodes (e.g. 22 nodes being 10% more than the maximum number of nodes and 24 being 20% more than the maximum number of nodes). An allocation space having a minimal size of 10-20% larger than the storage associated with the maximum number of node in the B-tree index structure may be used in connection with positional allocation as described herein.

An embodiment may select a cache size which is larger than the average distance between locations of entries or nodes in the index structure which are out of order with respect to keys or hash values corresponding to the entries. The foregoing is related to the average number of collisions per key or hash value when mapping the hash value to an index indicating a position at which to allocate storage from for the node. As described elsewhere herein when allocating nodes at single LBN boundaries, the hash value may be mapped to an index or LBN of the allocation space from which the B-tree index nodes are allocated. In one embodiment, the cache size may be selected as an integer or non-integer multiple of the foregoing average distance.

It should be noted that the foregoing average distance may be determined in any one or more of a variety of different ways. It may be empirically determined in accordance with observations as well as theoretically determined using the probability distribution function of the hashes.

Figure 23:
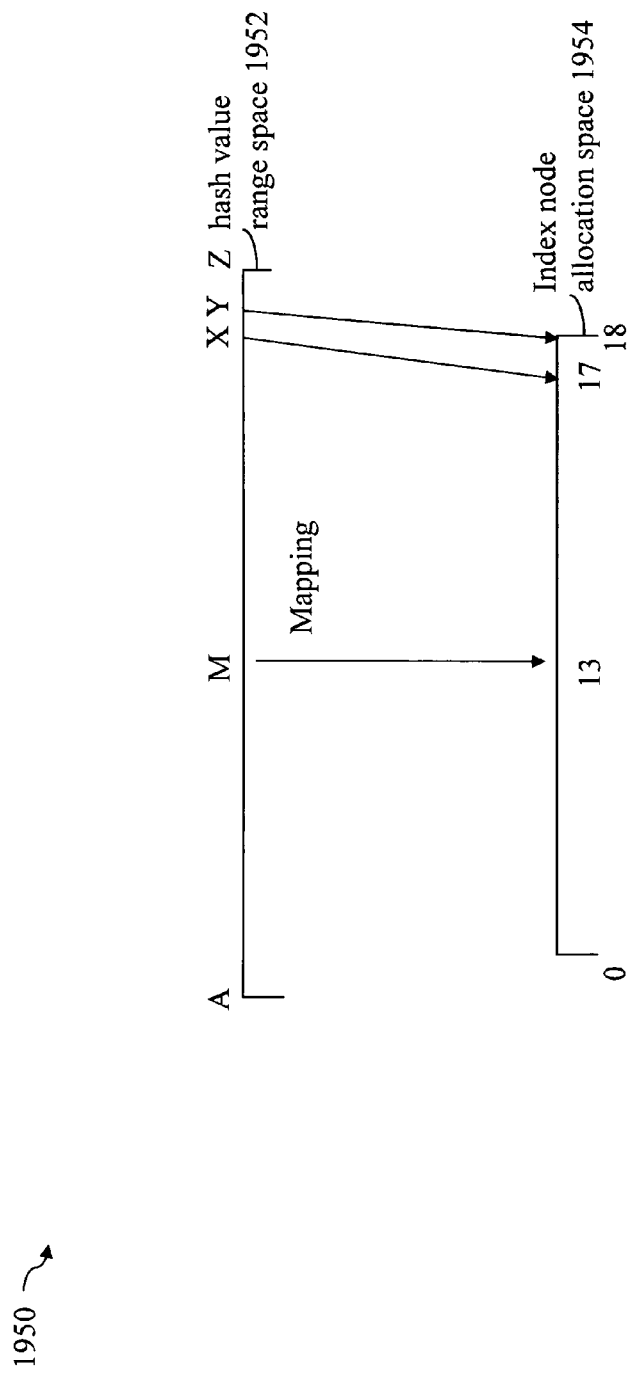
FIG. 23 is an example illustrating mapping of a hash value onto an index node in the index node allocation space.

Referring now to FIG. 23, shown is an example 1950 illustrating use of positional allocation in connection with the techniques described herein. The example 1950 illustrates the hash range value space 1952 using letters A . . . Z. It should be noted that each such element of the hash range may correspond to a numeric hash value of the position of the letter in the alphabet from 1 . . . 26 respectively. Thus, the hash range of keys in this example has 26 elements. Each hash value in the range 1952 is mapped to some address in the index node allocation space 1954. Using the positional allocation techniques described herein, the address or location at which storage is allocated for a node is determined in accordance with the node's corresponding hash value so that the physical location of a node in 1954 may be determined relative to other nodes using the node's hash value. In an embodiment, the size of 1954 may be the same size as 1952 so there are no collisions when mapping a hash value of 1952 to a location in 1954. The example 1952 illustrates a case where the allocation space 1954 is less than the size of the range 1952. In this example, there is space for 18 nodes in 1954 so a collision may occur when mapping a hash value from 1952 to an index indicating an address in 1954. The example 1950 illustrates that the node in the index structure having the hash value of M may be stored at index or LBN 13 if each node is stored on a single LBN boundary. At a later point in time, processing may be performed to allocate a node for the hash value of Y at LBN 18. At yet a later point in time, processing may be performed to allocate a node for the hash value of X. The initial mapping determined for the hash value of X may be allocate storage at LBN 18, which is already allocated. As such, processing is performed to resolve the mapping collision and the node for the hash value of X is allocated at LBN 17 (e.g., initial mapping −1 LBN). As described herein, an embodiment may utilize any one of a variety of different techniques in connection with resolving such mapping collisions when allocating index nodes. One embodiment described herein may perform a sequential search for the next available LBN with respect to the initial mapping by first determining if either LBN at the location: initial mapping +/−1 LBN is available. If not then the search for an available LBN is expanded by +/−1 additional LBN (e.g., initial mapping +/−2 LBNs), and so on, until an available LBN is determined. Using such techniques, the relative physical location of the node for a given key or hash value may be determined with respect to the key or hash value. As such, even if there is a collision, a search for a node may be performed starting at the initial mapping location determined using the hash value. On average, the physical location as determined using a resolution technique may be determined within a number of further inquiries in accordance with the average distance between locations of entries which are out of order with respect to corresponding hash values. The foregoing out of order is caused by such mapping collisions. The cache may be characterized as a window having a size of the cache. At any point in time, the cache may be loaded with valid nodes in the window.

In accordance with the positional allocation techniques described herein, when sequentially reading the B-tree index nodes from the persistent storage, the nodes for hash values may be in approximately ascending order with respect to the ordering of hash values. Using the techniques described herein, the foregoing order may be achieved for most, but not all hash values since there may be collisions when mapping a hash value (e.g. of 1952) to an index node number in the allocation space (e.g., 1954). Use of the positional allocation techniques may provide for performing large sequential reads of B-tree index data from the persistent storage into cache in order to determine a location of a node included therein such as, for example, when performing operations in connection with maintaining the B-tree structure. The contents of the cache may be loaded with the addresses of nodes with respect to a current update point. In one embodiment, the cache may accordingly updated as different portions of the B-tree index are updated in connection with processing merged log entries. As the hash value of the log file entries increases, the contents of the cache may be updated with respect to the hash value of the log file entry currently being processed. In one embodiment, the cache may be loaded with the nodes from the persistent storage which are within a "window" represented as a predetermined distance +/−the node address for the current hash value. The window size may be represented as the size of the cache. Thus, use of positional allocation as described herein provides for minimizing cache misses and when the cache is loaded, a sequential read may be performed in which a portion of the index structure is read from persistent storage and stored in cache in accordance with the window size. Given the positional allocation of each node in the index structure and the processing of the log file entries in increasing hash value order, subsequently processed log entries will utilize the cached portion of the index structure.

Figure 24A:
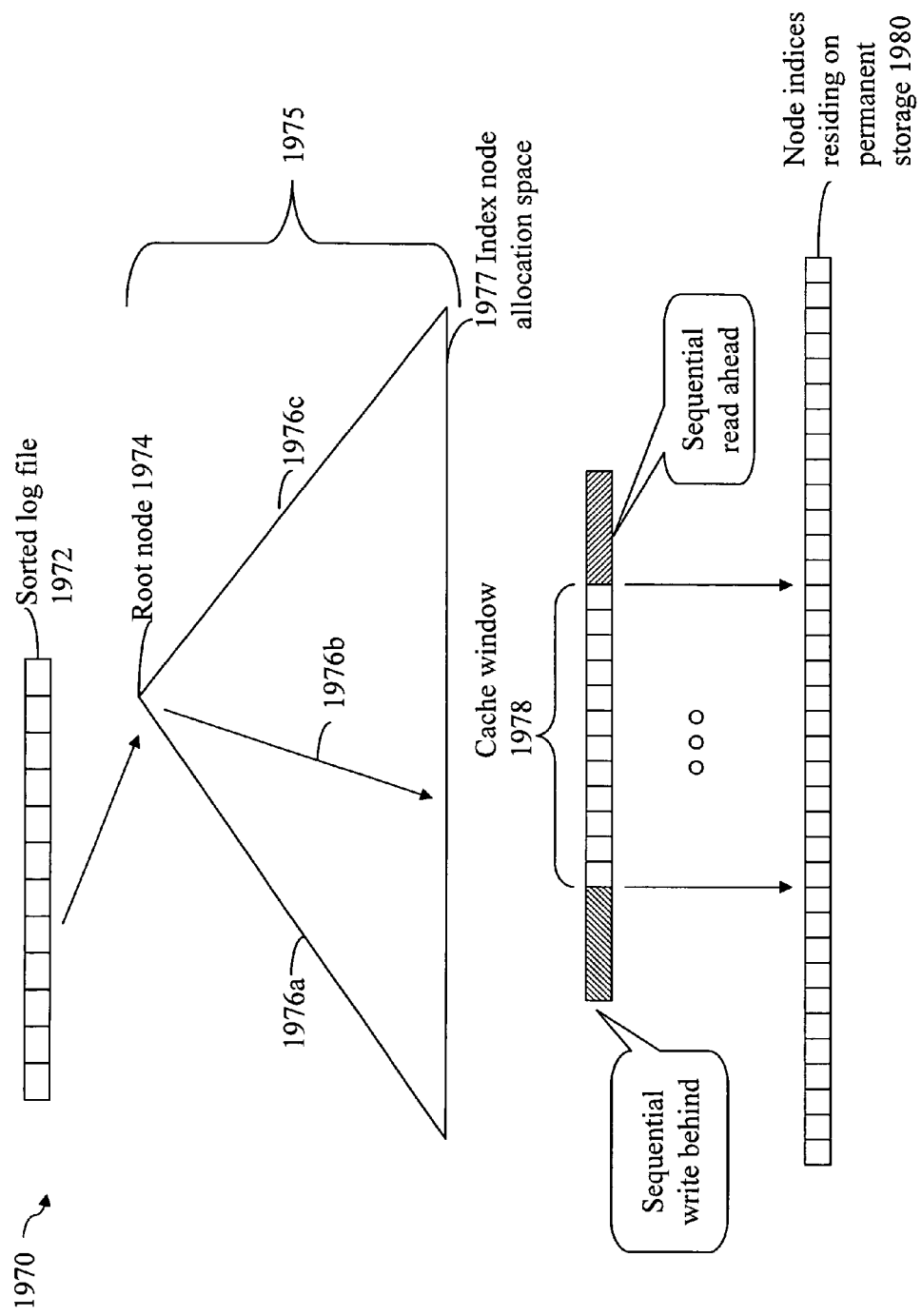
FIG. 24A is an example illustrating use of positional allocation in connection with caching of index nodes from permanent storage.

Referring now to FIG. 24A, shown is an example illustrating the use of the positional allocation techniques in connection with reading B-tree index nodes from persistent storage. The example 1970 illustrates how an embodiment may utilize positional allocation in connection with performing sequential block reads and writes of B-tree index nodes as just described. In the example 1970, a portion of the index structure as residing on permanent storage 1980 may be read sequentially in portions having a size of the cache window 1978. Element 1978 represents the portion of the index structure of 1980 stored in the cache at a point in time. Element 1975 may represent the placement of index structure nodes as they may appear in the index node allocation space. Element 1976*b* may represent the index node corresponding to the root node of the index structure. Element 1976*a* may represent the first index node possible in the allocation space 1977 and element 1976*b* may represent the last index node possible in the allocation space 1977. All other index nodes of elements in the binary tree correspond to one of the index nodes in the allocation space 1977. The contents of the cache may be updated by performing sequential reads and writes of cached index structure portions as the index node currently being processed changes. As described above, the index node currently being processed may be in accordance with the hash value of the sorted log file 1972 being processed. When the index node being processed is not found in cache, the portion of the index structure currently stored in cache may be sequentially written out to the permanent storage and a new portion from the permanent storage may be read into cache in accordance with the index node.

In an embodiment using a hashing function, such as the SHA-1 hashing algorithm, there is an assumption that the hash values generated will be approximately uniformly distributed. If there is a collision when mapping a hash value to the index node allocation space, a resolution technique may be utilized to find the nearest physical location with respect to the initially determined index node (e.g., address in the index node allocation space). An embodiment may use other resolution techniques.

What will now be described are techniques that may be used to initialize the cache for use in connection with processing a received data set for storage in the RDE appliance 24. The techniques that will be described may be referred to as affinity caching techniques.

The affinity caching techniques provide for initialization of the cache with one or more hash values or other tokens used to unique identify each data portion. The particular hash values with which the cache is initially populated may be determined in accordance with one or more previously stored data sets which contain, or are likely to contain, data portions similar to those of a data set currently being processed. Identification of the foregoing one or more previously stored data sets may be made using any one or more attributes or characteristics of the data sets. Described in following paragraphs are some attributes and techniques that may be used to identify such previously stored data sets.

Figure 24B:
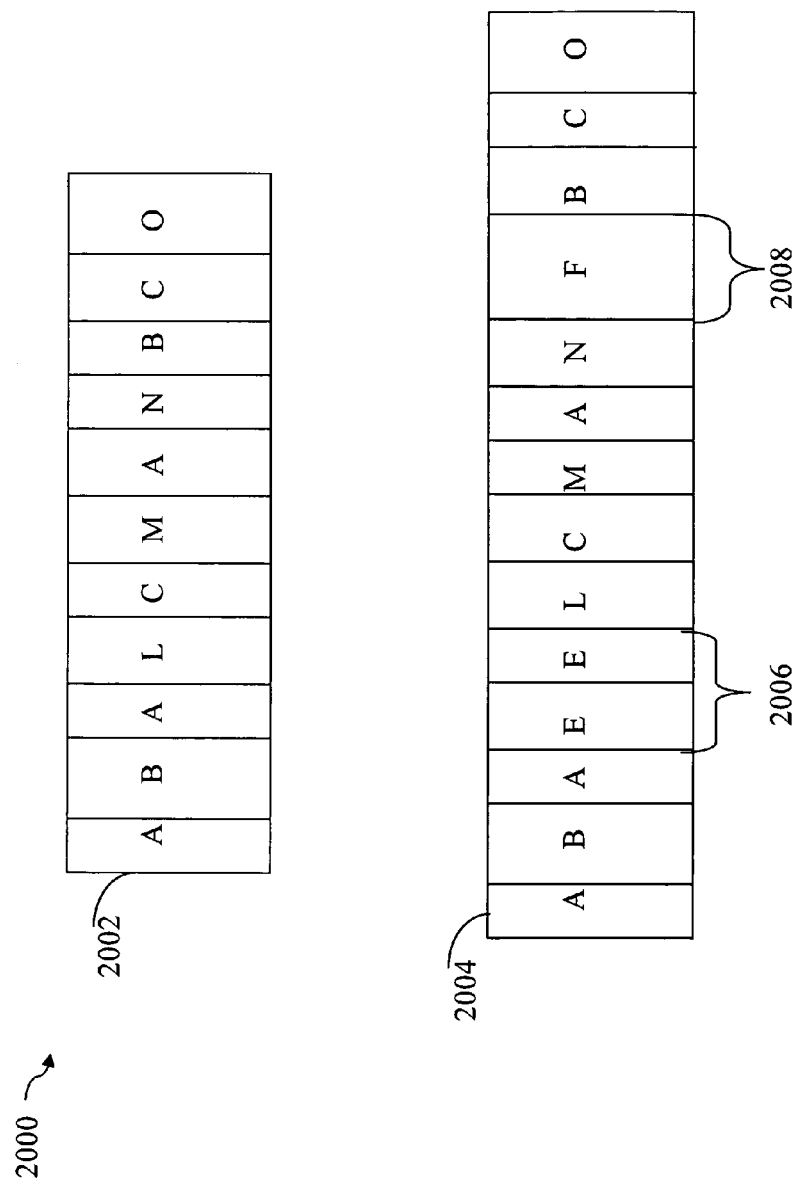
FIG. 24B is an example representation of two data sets in connection with the techniques described herein.

Referring now to FIG. 24B, shown is an example of two data sets. The two data sets 2002 and 2004 may represent, for example, backups of a same data set at two different points in time. Each of the data sets 2002 and 2004 may be partitioned into data portions of a fixed size as described elsewhere herein. The contents of each data portion in this example are represented using letters of the alphabet as illustrated. In the example 2000, the data set 2002 is partitioned into 11 data portions and the data set 2004 is partitioned into 14 data portions. The data set 2002 may represent a first backup of a data set at a first point in time and the data set 2004 may represent a second backup of the data set at a second later point in time. For example, the data set 2002 may represent a backup of a file from Sunday and the data set 2004 may represent a backup of the same file on the following Monday after a user has made some edits to the file. As such, the data portions between the two files in this example are similar except for those portions which have been edited. In this example, the edit resulted in adding content to the file as indicated by 2006 and 2008.

The data set 2002 may be stored in the data storage systems of the RDE appliance 24 using the techniques described herein. When processing is performed to store the data set 2002 in accordance with techniques described herein, the data portions are stored in pool locations, the appropriate index structures are updated, and the like. Additionally, a reference save set (RSS) for the data set 2002 is created which includes the hash values for each of the data portions of 2002. Examples of the RSS for a data set are illustrated, for example, as elements 214 and 224 in FIG. 3 described elsewhere herein. Using the affinity caching techniques, the cache may be initialized in accordance with RSS for the data set 2002 when processing data set 2004. The cache may be initialized, for example, with the hash values included in the RSS for data set 2002 in connection with storing data set 2004. Since the data portions of data set 2002 are similar to those of 2004, such cache initialization may be used to reduce the I/O and processing associated with storing the data set 2004 as will be illustrated in more detail in following paragraphs.

Figure 25:
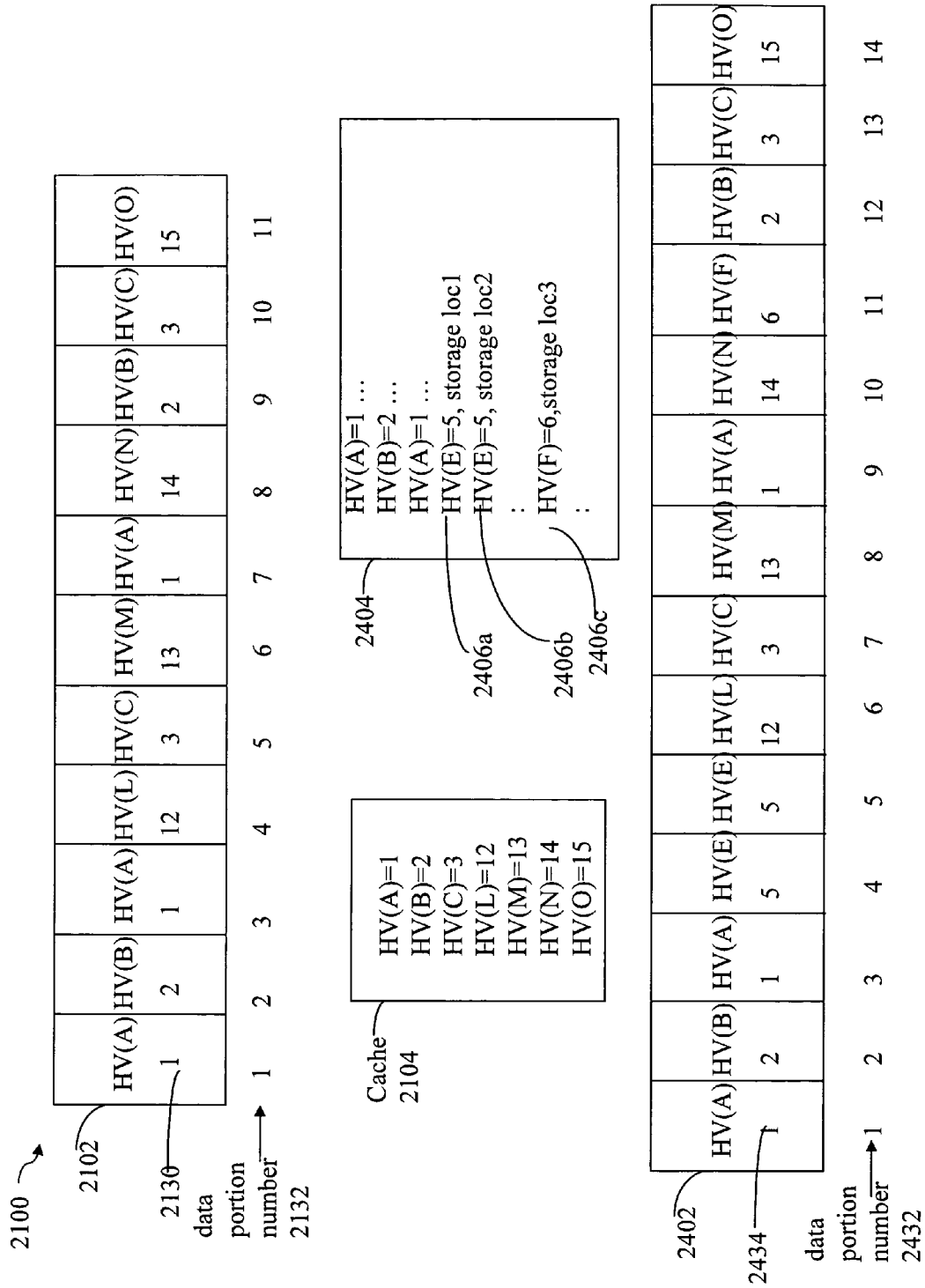
FIG. 25 is an example illustrating use of affinity caching techniques described herein.

Referring now to FIG. 25, shown is an example illustrating the use of the affinity caching techniques. Included in the example 2100 is RSS 2102 for the data set 2002, a cache 2104, a log file 2404, and RSS 2402 for the data set 2004. At a point prior to processing data set 2004, the data set 2002 may be processed and stored in the data storage 30 of the RDE appliance 24 along with its corresponding RSS 2102. Using the techniques herein, the RSS 2102 may be generating and includes hash values of each of the data portions in data set 2002. The hash value for a data portion "X" is denoted "HV (X)" herein. Additionally, the numeric hash value corresponding to each data portion is denoted with a numeric value 2130 for purposes of illustration. The $i^{th}$ hash value of 2102 is denoted using integers below each data portion as illustrated by 2132.

One or more attributes of the data set 2004 may be considered in connection with identifying if there are any previously stored data sets which are likely to contain similar data portions. Metadata regarding the data set 2004 may be provided and one or more attributes included in the metadata may be used to identify any such previously stored data sets. The metadata may be obtained, for example, from a backup request to backup the data set 2004. The metadata may also be obtained, for example, by scanning one or more portions of a received data set. The metadata may indicate, for example, a data source or producer of the data set, or portions thereof. The type of information that may be used in determining similar or relevant previously stored data is described in more detail elsewhere herein. One or more pieces of metadata for 2002 may be compared to one or more pieces of metadata for 2004 to determine a degree of similarity, or likelihood thereof, between data portions of 2002 and 2004.

In connection with this example, the one or more attributes of the data set 2004 may indicate that data set 2004 is a backup on "DATE MONTH/DAY/YEAR", "MONDAY" for "HOST NAME1" by "SERVER NAME1". In this example, "SERVER NAME1" indicates the server which performed the backup and "HOST NAME1" may indicate the host whose data has been backed up by "SERVER NAME1". Other information may be used in connection with identifying the data source of the backup in an embodiment. The RDE appliance 24 may perform processing to search a list of previously stored data sets to determine if any previous backups for the same "HOST NAME1" exist. If so, the RDE appliance 24 may initialize the cache in accordance with the RSS for the previous backup when processing data set 2004.

In this example 2100, the RDE appliance 24 identifies the RSS 2102 as an RSS of a previous backup for "HOST NAME1". The RSS 2102 for the previous back data set 2002 is read and the hash values may be sorted and processed to remove duplicate hash value entries. The resulting list of sorted and merged hash values may be stored in the cache 2104. In one embodiment, the hash values may be stored in the cache in increasing hash value order. The cache 2104 includes an entry for each unique hash value appearing in the RSS 2102.

Included in the example 2100 is RSS 2402 for the data set 2004. When the data set 2004 is processed, the hash values for data portions of the data set are determined. The list of hash values is represented as the RSS 2402. The $i^{th}$ hash value of 2402 is denoted using integers below each data portion as illustrated by 2432. In connection with the affinity caching techniques herein, each hash value of the RSS 2402 is read. For each hash value in 2402, a determination is made as to whether the hash value is in cache. If so, it may be determined that the corresponding data portion for the hash value has already been stored in the storage pool and processing does not need to be performed to write the data portion to the storage pool as described elsewhere herein. If the hash value is not found in cache, the corresponding data portion is stored to a location on one of the LUNs of the storage pool allocated for the exclusive use of the process that is processing the data set 2004.

As each hash value of 2402 is processed, an entry may be written to the appropriate private log file of the process in accordance with the particular hash value being processed. Recall, as described elsewhere herein, that a process may have "n" private log files in an embodiment in which the index structure is partitioned into "n" index structures. Each of the "n" index structures includes entries for a portion of possible hash range values. An entry is written to one of the process's private log files when the hash value is in found cache as well as when the hash value is not found in the cache 2104. In the case where the hash value is not found in the cache 2104, the written log file entry also identifies the location in the storage pool where the data portion associated with the hash value has been stored. With reference to the example 2100, only a single log file is shown for the sake of simplicity of illustration of the techniques herein.

What will now be described is processing of the particular hash values of 2402. With reference to HV(A) (e.g., which is equal to 1 as denoted with 2434) for the first data portion of 2402, a determination is made that the hash value of 1 is in the cache. Since the hash value is in cache, it is determined that the corresponding data portion A is already stored at a location in the storage pool. An entry is made to the log file so that the appropriate reference count to data portion A may be determined when merging the log files as described elsewhere herein. When processing the hash values of 2402, the first three hash values are found in cache. For the fourth hash value, HV(E), no entry is found in cache 2104 and the corresponding data portion E is written to a location of one of the LUNs of the storage pool allocated for exclusive use when processing the data set 2004. The log entry 2406*a* is then written out to the log file 2404 and includes the storage location for the data portion E (e.g., denoted "storage loc1"). Similarly, when processing the fifth hash value, HV(E), no entry is found in cache and the corresponding data portion E is written to a location of one of the LUNs of the storage pool allocated for exclusive use when processing the data set 2004. The log entry 2406*b* is then written out to the log file 2404 and includes the storage location for the data portion E (e.g., denoted "storage loc2"). Note that as described elsewhere herein, the duplicate entries 2406*a* and 2406*b* will be merged as part of generating a merged log file. As part of this merging, only one instance of the stored data portion E, such as stored at "storage loc1" will remain allocated. The other storage locations (e.g., "storage loc2") associated with duplicate entries for HV(E) (e.g., entry 2406*b*) will be made available for use for storing other data. In connection with processing the remaining hash values of 2402, all hash values are found in cache except for HV(F), the eleventh hash value in 2402. For HV(F), processing similar to that as described in connection with HV(E) may be performed. Entry 2406*c* corresponds to the log file entry for the eleventh hash value HV(E) of 2402.

Once the hash values of 2402 have been processed as just described, processing is performed to merge the log files and accordingly update the index structure. When updating the index structure in accordance with a hash value of a log entry of 2404, the reference count of the index node for the hash value is incremented. For those entries in 2404 that do not include a storage location, the corresponding nodes of the index structure each already identify a location in the storage pool at which the data portion is stored. Merging the log files and updating the index structure are described elsewhere herein in more detail.

Figure 26:
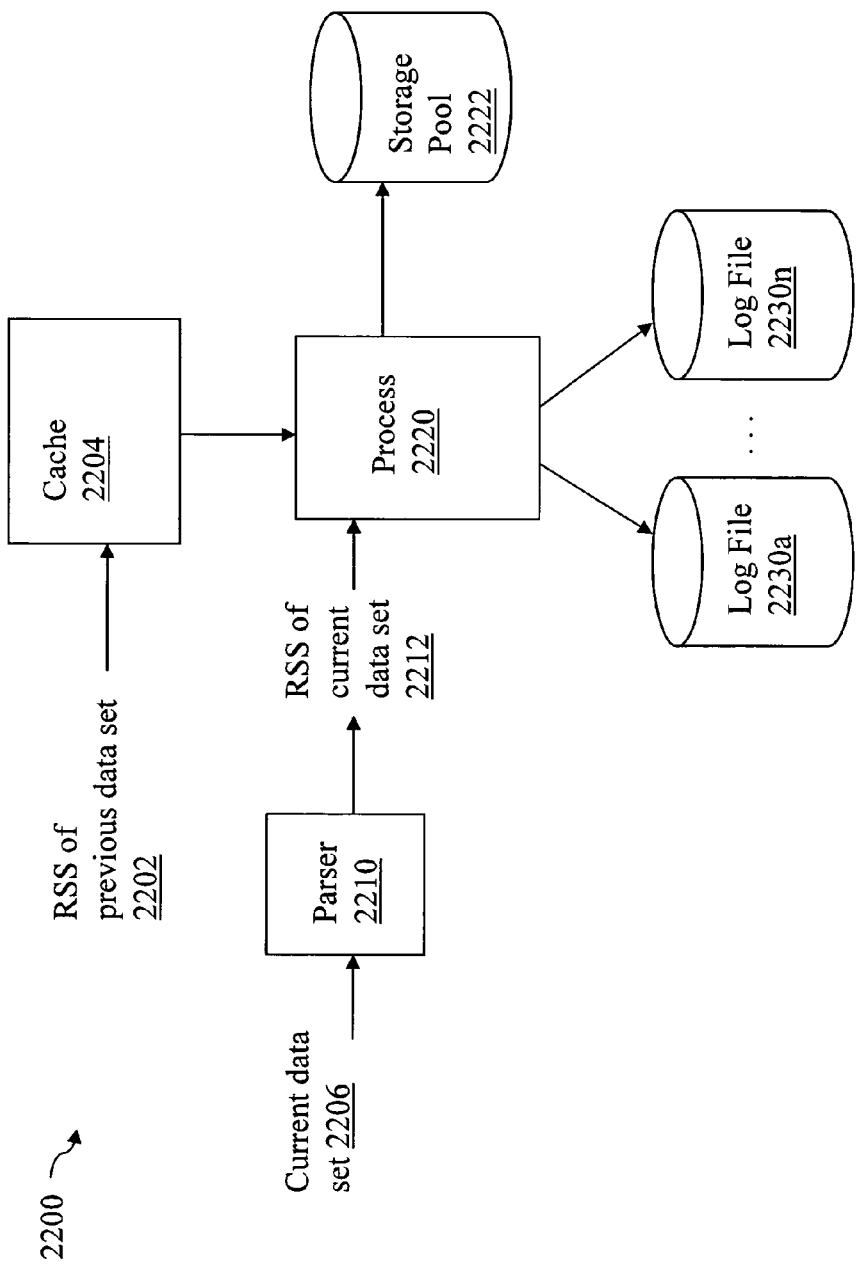
FIG. 26 is an example illustrating the data flow between components in connection with the affinity caching techniques described herein.

Referring now to FIG. 26, shown is an example illustrating the data flow between the different components in connection with processing just described utilizing the affinity caching technique. At a first point in time, a first data set is stored having an RSS 2202. At a later point in time, a current data set 2206 is received and processed for storing in connection with the techniques described herein. The RSS 2202 is determined to contain, or is likely to contain, data portions similar to those of the current data set 2206. The cache 2204 may be initialized to include the hash values of the RSS 2202. The current data set 2206 is partitioned into data portion, such as by a parser 2210. The hash values of each data portion of 2206 are determined and included in the RSS 2212 for the current data set. Process 2220, which is processing the current data set 2206, examines each hash value in the RSS 2212 and determines if the hash value is in cache 2204. If not, the process 2220 writes out the data portion of the current hash value to a location in the storage pool 2222. As described elsewhere herein, element 2222 may be a LUN allocated for exclusive use by the process 2220 for processing the data set 2206. The process 2220 also writes an entry to the appropriate private log file of the process 2220. The entry identifies the current hash value and the location in the storage pool of the data portion corresponding to the current hash value. The log file may be selected in accordance with the current hash value as described elsewhere herein. If the current hash value is in cache, an entry is also made to the appropriate log file but no location in the storage pool is noted. The log files of the process 2220 may then be merged with other processes as described elsewhere herein.

Figure 27:
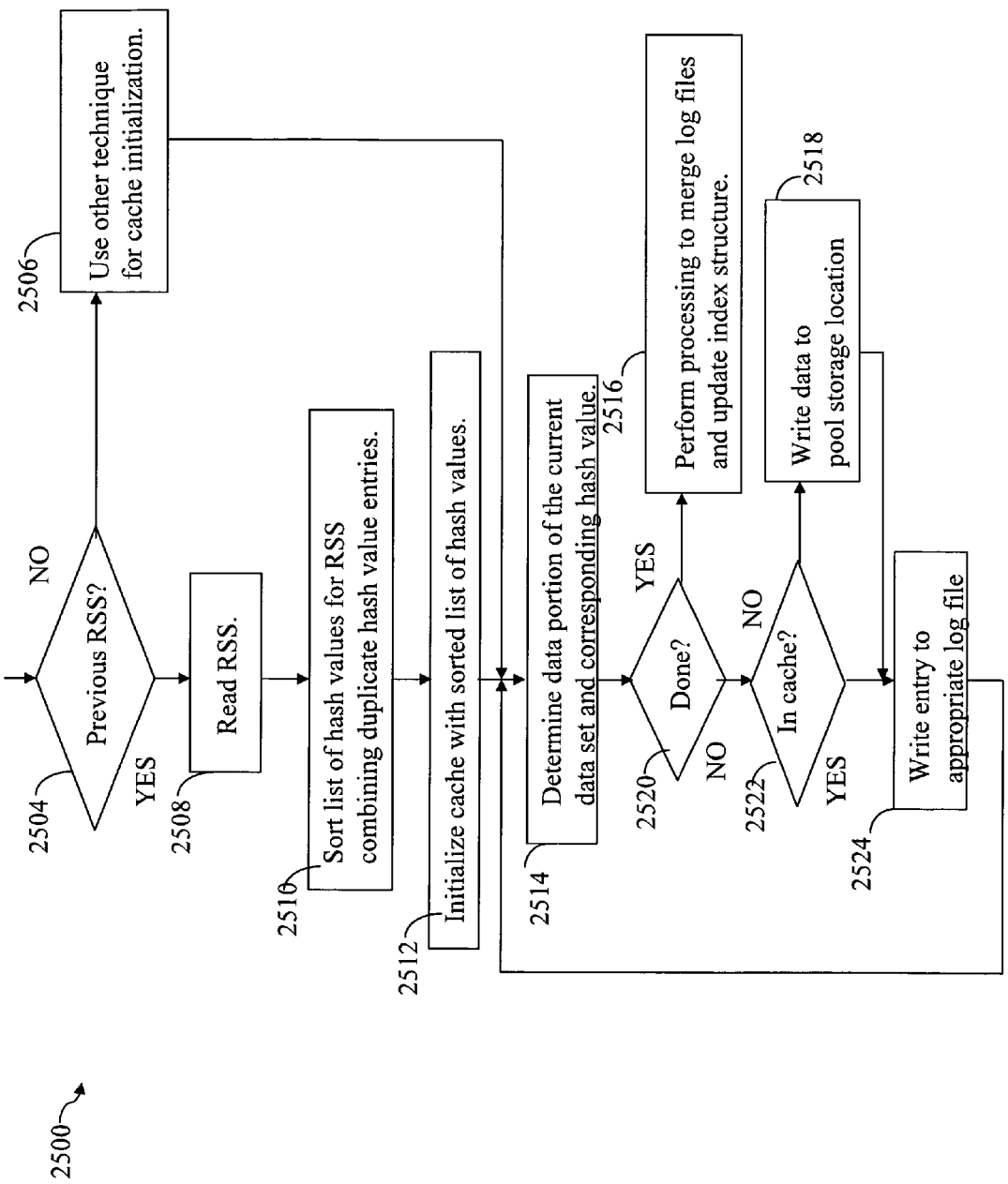
FIG. 27 is a flowchart of processing steps that may be performed in an embodiment in connection with the affinity caching techniques described herein.

Referring now to FIG. 27, shown is a flowchart of processing steps that may be performed in an embodiment in connection with the affinity caching techniques. Flowchart 2500 summarizes processing just described. At step 2504, a determination is made as to whether there is an existing RSS which is likely to contain similar data portions to a current data set being processed. If step 2504 evaluates to no, control proceeds to step 2506 where an alternative cache initialization technique may be used and control proceeds to step 2514. In connection with step 2506, if no existing RSS can be determined, a default cache initialization technique may be utilized. Alternatively, an embodiment may not perform any processing to initialize the cache. If step 2504 evaluates to yes, control proceeds to step 2508 to read the existing RSS of hash values for a previously stored data set. At step 2510, a list of sorted hash values combining any duplicate hash value entries is produced. The list may be sorted in accordance with increasing hash values. At step 2512, the cache is initialized to include those hash values from step 2510. Processing of the current data set is performed by the loop formed beginning with step 2514. One loop iteration is performed for each data portion of the current data set. At step 2514, a data portion and a corresponding hash value for the data portion are determined.

At step 2520, a determination is made as whether processing of the hash values for the current data set is complete. If not, control proceeds to step 2522 to make a determination as to whether the hash value from step 2514 is in cache. If not, control proceeds to step 2518 where the data portion from step 2514 is written to a location in the storage pool. Control proceeds to step 2524 to write a corresponding entry in one of the private log files of the process processing the current data set. From step 2524, control proceeds to step 2514 to process remaining data portions of the current data set. If step 2522 evaluates to yes, control proceeds to step 2524.

If step 2520 determines that all hash values have been processed, control proceeds to step 2516 to perform processing to merge log files of the currently executing process and any other process processing a tape in the same batch. Using the one or more merged log files, the index structure may be accordingly updated. Processing of step 2516 is described elsewhere herein in more detail.

An embodiment may use a variation of the processing illustrated in FIG. 27. As illustrated in connection with FIG. 27, the cache is initially populated with hash values from one or more previously stored data sets and is not subsequently updated. Alternatively, an embodiment may initialize the cache as illustrated in step 2512 and then perform additional processing in connection with step 2518 when a hash value is determined not to be in the cache. In such instances when step 2522 evaluates to no, an embodiment may choose to selectively update the cache with an additional hash value when there is a cache miss. For example, an embodiment may update the cache with a hash value if it is expected that the hash value will be encountered in subsequent processing of the current data set. An embodiment may use one or more heuristics to make such a determination as to when to selectively update the cache at step 2518. For example, if there are two cache misses for a same hash value, the cache may be updated to include the hash value upon the occurrence of the second cache miss. Other techniques may be used in connection with selectively updating the cache.

It should be noted that flowchart 2500 includes initializing the cache with a single RSS. However, as described below, the cache may be initialized to include more than one RSS.

In the foregoing description, when processing a current data set, the cache may be initialized using an existing RSS corresponding to a file or backup data set representing a previously stored version of the current data set. This is one example of an existing RSS which is likely to contain data portions similar to those of the current data set.

The information used to determine whether an existing data set that is stored in the RDE appliance actually contains, or is likely to contain, similar data portions may include information in the backup request, such as the tape attributes described herein. Additional metadata may also be obtained by reading portions of a received data set. If the same metadata information is also stored with a previously generated RSS, an embodiment may compare the additional metadata for the current data set to that of the previously generated RSS. The additional metadata may relate, for example, to the backup format and/or backup application and may indicate whether a data set is a full or partial backup. As another example, if a data set is a database, the additional metadata may identify the particular host, operating system, database application, and additional database characteristics. As yet another example, a data set may include directories, files, and the like having corresponding metadata information regarding the filenames, file length, directory names, and the like. Metadata information about the directories and files may be used in connection with identifying an RSS corresponding to an entire data set (e.g., an entire backup data set), or portions of a previously stored data set (e.g., for one or more files or directories included in a previous backup of an entire device).

An embodiment may also initialize the cache when processing a received data set with an RSS of a previously stored data set having a synchronized hash value stream with the RSS of the received data set. For example, an embodiment may determine the RSS for a received data set and compare the RSS of the received data set to the RSS of the previously stored data set. Different heuristics may be used to determine the degree of synchronization between the two RSS streams of hash values. An embodiment may specify a threshold or minimum level of synchronization between the two RSS hash value streams in order to initialize the cache based on the RSS of the previously stored data set. For example, similar to techniques used to compare files, a comparison can be made between the two RSS hash value streams. A determination regarding synchronization can be made depending on how many similarities and/or differences are detected. An embodiment may specify, for example, a threshold number of similarities or differences as a ratio with respect to the total hash values examined.

If a new host is doing a backup for the first time, one or more of the foregoing techniques may be used to determine if there are any existing RSSs of previous backups for other hosts which may contain similar data. One or more pieces of metadata information regarding the new host may be used to make such a determination. For example, if host 1 uses operating system 1 and file system 1, and a new host, host 2, also uses operating system 1 and file system 1, an existing RSS for host 1, or portions of the existing RSS, may be used to initialize the cache when processing a data set for host 2.

In connection with the foregoing, the cache may be initialized to include more than one RSS. For example an embodiment may specify a maximum number of RSSs to use in connection with the foregoing affinity caching technique. An embodiment may initialize the cache, for example, with a plurality of the most recent previous versions of a file, backup data set, and the like. An embodiment may also set a limit on the amount of cache initialization in accordance with a fixed size or portion of the cache.

The amount of cache initialized may also be determined based on a worst case retrieval or searching heuristic. An embodiment may limit the amount of data stored in the cache in connection with initialization using the affinity-based technique based on a worst-case retrieval situation for the amount of cached data. This may vary with embodiment based on the processing performed to retrieve and search the cache. For example, in one embodiment, a binary searching technique may be used to locate a desired cache entry. The larger the cache portion used in connection with the affinity cache initialization technique, the greater the chances of a cache hit. However, this is balanced with the fact that the larger the cache portion, the greater the amount of time required to search the cache for a hash value.

It should be noted that any one of a variety of different techniques may be used in connection with accessing the cache and populating the cache. For example, an embodiment may perform application level caching to lock the physical memory associated with the cache.

The foregoing are some examples of techniques that may be used in connection with the affinity-based caching described herein for processing a received data set in which the cache is populated in accordance with the input stream of previously stored data. The previously stored data may be determined to contain data portions similar to, or the same as those included in, the received data set. The similarity determination may be made by comparing one or more pieces of metadata about a received data set to metadata of the previously stored data, hash values for data portions and/or other techniques described herein, and others known in the art. The cache may be initialized with the tokens representing the data portions of a previously stored data set which is similar to a data set currently being processed.

It should be noted that an embodiment may utilize any one or more of the techniques described herein alone, or in combination with, other techniques. One embodiment may utilize the techniques described herein in connection with a single instance storage technique as well as one or more other techniques for data protection. For example, an embodiment may utilize the techniques herein in connection with a planned redundancy technique such as a RAID technique, a technique using erasure codes, and other replication techniques. It should be noted that use of SIS techniques provides for elimination or unintended redundancy with respect to stored data and use of a technique for data protection may provide for a planned data redundancy in the event of a data device failure. An embodiment may utilize the techniques herein with SIS techniques in combination with a data protection technique, for example, having planned redundancy in the event of a device failure.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of managing an index structure used to access data portions comprising:

providing a token having a token value for a data portion;

providing an entry in said index structure for said data portion, wherein said index structure is accessed using said token value as a key to determine said entry in said index structure for said data portion, and wherein each entry of said index structure is allocated to have a physical storage location with a position relative to other physical storage locations of other entries in said index structure in accordance with said token value of said each entry, entries of said index structure having corresponding token values, said corresponding token values having a sequential ordering wherein physical storage locations of said entries are located at positions relative to one another in accordance with positions in said sequential ordering of said corresponding token values for said entries, wherein token values used as keys in connection with said index structure are approximately uniformly distributed with respect to a token value range;

determining an initial address of said entry in accordance with said token value of said data portion; and if said initial address identifies a first physical storage location which is already allocated for use with another token value and corresponding entry of said index structure, determining a second address for said entry using a resolution technique identifying a second physical storage location which is an available storage location nearest to said first physical storage location initially determined, wherein said index structure includes a unique entry for each data portion and the data portion is stored in one or more data storage systems including only a single copy of each data portion, the unique entry including a reference count indicating a number of times the data portion is referenced in one or more data segments stored in said one or more data storage systems.

2. The method of claim 1, wherein said index structure is a B-tree index structure.

3. The method of claim 2, wherein said B-tree index structure is partitioned into a number of index structures, each of said index structures being associated with a portion of said token value range of token values for data portions.

4. The method of claim 1, wherein said entry is allocated from an allocation space having a size determined in accordance with a maximum number of possible nodes in said index structure.

5. The method of claim 1, wherein a size of the allocation space from which said entry is allocated is selected to be a value in a range of 10% to 20% more than a size associated with a maximum number of possible nodes in said index structure.

6. The method of claim 1, wherein each data portion has a same fixed length.

7. The method of claim 1, wherein a cache size is selected as being an integer value larger than an average distance between physical storage locations of entries in said index structure which are out of order with respect to two token values corresponding to the entries, wherein a first of said token values is less than a second of said token values, and a first entry in said index structure associated with said first token value is allocated at a first physical storage location and a second entry in said structure associated with said second token value is allocated at a second physical storage location, the first physical storage location having an address which is greater than an address of the second physical storage location.

8. The method of claim 7, wherein a cache size is selected as being an integer multiple of said average distance between physical storage locations of entries in said index structure which are out of order with respect to two token values corresponding to the entries.

9. The method of claim 1, further comprising:
storing said data portion at a storage location, wherein said entry indicates said storage location of said data portion and said index structure is accessed using said token value as a key to determine said storage location of said data portion.

10. A method of storing data comprising:
receiving a plurality of data portions and a corresponding token having a token value for each of the data portions; and updating an access structure to include entries for said plurality of data portions, wherein the access structure is indexed by token values of the data portions, each of said entries for each token value being located at an address identifying a physical storage location at which storage is allocated for said entry, said physical storage location determined in accordance with said each token value, entries of said access structure having corresponding token values, said corresponding token values having a sequential ordering wherein physical storage locations of said entries are located at positions relative to one another in accordance with positions in said sequential ordering of said corresponding token values for said entries, wherein token values used as keys in connection with said index structure are approximately uniformly distributed with respect to a token value range; wherein, for at least a first of said entries, the method further comprising:

determining an initial address of said first entry in accordance with said token value of said data portion; and if said initial address identifies a first physical storage location which is already allocated for use with another token value and corresponding entry of said index structure, determining a second address for said first entry using a resolution technique identifying a second physical storage location which is an available storage location nearest to said first physical storage location initially determined, wherein said index structure includes a unique entry for each data portion and the data portion is stored in one or more data storage systems including only a single copy of each data portion, the unique entry including a reference count indicating a number of times the data portion is referenced in one or more data segments stored in said one or more data storage systems.

11. The method of claim 10, further comprising:
storing each of the data portions to a different storage location.

12. The method of claim 10, wherein each of said plurality of data portions are of a same size, and each token value is a hash value.

13. A computer readable storage medium comprising code stored thereon for managing an index structure used to access data portions, the computer readable medium comprising code executing instructions for:

providing a token having a token value for a data portion;

providing an entry in said index structure for said data portion, wherein said index structure is accessed using said token value as a key to determine said entry in said index structure for said data portion, and wherein each entry of said index structure is allocated to have a physical storage location with a position relative to other physical storage locations of other entries in said index structure in accordance with said token value of said each entry, entries of said index structure having corresponding token values, said corresponding token values having a sequential ordering wherein physical storage locations of said entries are located at positions relative to one another in accordance with positions in said sequential ordering of said corresponding token values for said entries, wherein token values used as keys in connection with said index structure are approximately uniformly distributed with respect to a token value range;

determining an initial address of said entry in accordance with said token value of said data portion; and if said initial address identifies a first physical storage location which is already allocated for use with another token value and corresponding entry of said index structure, determining a second address for said entry using a resolution technique identifying a second physical storage location which is an available storage location nearest to said first physical storage location initially determined, wherein a cache size is selected as being an integer value larger than an average distance between physical storage locations of entries in said index structure which are out of order with respect to two token values corresponding to the entries, wherein a first of said token values is less than a second of said token values, and a first entry in said index structure associated with said first token value is allocated at a first physical storage location and a second entry in said structure associated with said second token value is allocated at a second physical storage location, the first physical storage location having an address which is greater than an address of the second physical storage location.

14. The computer readable storage medium of claim 13, wherein said index structure is a B-tree index structure.

15. The computer readable storage medium of claim 14, wherein said B-tree index structure is partitioned into a number of index structures, each of said index structures being associated with a portion of said token value range of token values for data portions.

16. The computer readable storage medium of claim 13, wherein said index structure includes a unique entry for each data portion and the data portion is stored in one or more data storage systems including only a single copy of each data portion, the unique entry including a reference count indicating a number of times the data portion is referenced in one or more data segments stored in said one or more data storage systems.

17. The computer readable storage medium of claim 13, wherein said entry is allocated from an allocation space having a size determined in accordance with a maximum number of possible nodes in said index structure.

* * * * *